US012121484B1

(12) United States Patent
LeGrand

(10) Patent No.: US 12,121,484 B1
(45) Date of Patent: Oct. 22, 2024

(54) BED MOBILITY PLATFORM DEVICE

(71) Applicant: Nicholas John LeGrand, Hockessin, DE (US)

(72) Inventor: Nicholas John LeGrand, Hockessin, DE (US)

( * ) Notice: Subject to any disclaimer, the term of this patent is extended or adjusted under 35 U.S.C. 154(b) by 0 days.

(21) Appl. No.: 18/658,821

(22) Filed: May 8, 2024

(51) Int. Cl.
*A61G 7/053* (2006.01)
*A47C 21/00* (2006.01)
*A47C 21/08* (2006.01)
*A61G 7/05* (2006.01)

(52) U.S. Cl.
CPC .............. *A61G 7/053* (2013.01); *A47C 21/08* (2013.01); *A47C 21/00* (2013.01); *A61G 7/05* (2013.01)

(58) Field of Classification Search
CPC .......... A61G 7/053; A61G 7/05; A47C 21/08; A47C 21/00; A47C 31/00
USPC ....................... 5/662, 659, 658, 507.1, 503.1
See application file for complete search history.

(56) References Cited

U.S. PATENT DOCUMENTS 1,372,105 A * 3/1921 Stulck ...................... A47D 7/00 5/2.1
2,445,619 A * 7/1948 Josephs .................. A61G 7/053 5/81.1 R
2,524,971 A * 10/1950 Gray ....................... E06C 1/397 182/64.1
2,659,902 A * 11/1953 Fitzgerald et al. .... A61G 7/053 182/39
4,139,077 A * 2/1979 Pena, Jr. ................ A47C 19/20 182/35
4,359,793 A * 11/1982 Hosono .................... A47D 7/00 182/35
9,055,824 B2 * 6/2015 Brown ................... A01K 1/035
9,314,106 B2 * 4/2016 Brown ................... A47C 21/00
2013/0111663 A1 * 5/2013 Brown ................... A47C 21/00 5/507.1
2015/0272337 A1 * 10/2015 Brown ................... A47C 21/00 5/507.1

* cited by examiner

*Primary Examiner* — Robert G Santos

(57) ABSTRACT

The bed mobility platform device assists users in lifting their lower extremities onto and off of a bed. To meet the needs in the field of adaptive bed mobility devices, this invention comprises bed mobility assistive platform device with a step assembly further comprising two or more platforms to provide simple maneuvering capabilities for individuals that have difficulty safely and efficiently lifting their lower extremities into bed and a method of ascending and descending from the bed. The step assembly is retained and secured between opposed surfaces of at least one article of furniture, such as a mattress and a box spring. The device enables simple maneuvering capabilities for individuals who have difficulty safely and efficiently lifting their lower extremities into bed.

20 Claims, 30 Drawing Sheets

BED MOBILITY PLATFORM DEVICE

PRIORITY

This application claims the benefit under 35 U.S.C. 119 (e) of U.S. Provisional Patent Application No. 63/502,062, filed May 12, 2023 for "Bed Mobility Platform Device," which patent application is hereby incorporated by reference.

FIELD OF THE INVENTION

The present invention pertains to the field of adaptive bed mobility devices.

BACKGROUND OF THE INVENTION

Many individuals have difficulty safely and efficiently lifting their lower extremities into bed. These difficulties might arise from a variety of factors, such as, but not limited to, advanced age, neurologic disease, injury, and surgical intervention. An inability to safely and consistently lift one's legs into bed contributes to increased reliance on caregivers, an increased risk for strain due to improper lifting technique, and the potential for falls, among other safety risks and personal hardships. If an individual is not able to safely maneuver in and out of bed, it can lead to increased pain and even injury. Lack of mobility also contributes to difficulties with satisfying basic needs, such as toileting, as individuals may not be able to re-enter their bed after exiting to toilet. For these reasons, there exists a clear need for a device, such as the bed mobility assistive platform device, to allow individuals to safely and independently increase their mobility.

Existing equipment designed to assist individuals in bringing their legs into bed, such as traditional step stools, can be difficult to maneuver independently and can create an obstacle to entering and exiting the bed if left in place at the bedside due to their large, forward-facing profile. A larger profile also presents an impediment to assistive devices including front-wheeled walkers, rollators, and canes, contributing to an elevated fall risk for the user. Frail, deconditioned, or injured individuals may not be able to safely maneuver a typical step or stool into and out of position safely and without assistance. Use of a two-handed assistive device such as a walker adds to this difficulty. These devices often require an individual to place their full weight on the device and step upward, creating additional fall risk for those individuals of decreased strength or impaired balance.

Other equipment such as traditional loop-style leg lifting devices are comprised of a rigid leash with a semi-rigid loop on one end. Users hook the open loop over their foot and use their arms to lift their leg to the bed surface. This poses a difficulty for weakened and deconditioned individuals who lack the upper body strength to lift their legs into bed. Individuals with impacted motor control due to neurological disease or stroke may not have the coordination to advance the leg lifter loop over their foot. Individuals with visual deficits may be similarly challenged.

Accordingly, there is a need for a device that is lightweight and easy to maneuver into operating position. There also exists a need for a device of sufficiently slim profile that does not present an obstacle or hazard to entering or exiting the bed when left in place between uses. There is a need for an assistive device for those individuals lacking sufficient arm strength or coordination to pull their legs into bed. Finally, there is a need for a device that does not require the user to place their full weight onto the device from a standing position due to the potential fall risk posed by imbalance or weakness.

The present invention comprises a bed mobility assistive platform device with a plurality of two or more platforms to provide simple maneuvering capabilities for individuals that have difficulty safely and efficiently lifting their lower extremities into bed.

SUMMARY OF THE INVENTION

The general purpose of the present invention, which will be described subsequently in greater detail, is to aid a user in ascending or descending to and from an article of furniture, such as a bed. The device comprises of a multilevel step assembly featuring a plurality of platforms of increasing heights fully elevated above ground level. The step assembly comprises a defined horizontal tread portion, hereinafter known as a platform, in which a user can place their foot. Each platform is connected to an adjacent platform by a riser, henceforth known as a vertical connector. The device is supported by a securing support under a platform on one end, with the other end attached between the opposing surfaces of an article of furniture. The at least one or more securing support(s) is in a cantilevered configuration of the step assembly, allowing the step assembly to sit flush and parallel against the perimeter or side of an article of furniture with the slope oriented parallel to a vertical plane defined by the lateral edge surfaces of the opposing surfaces of an article of furniture. The securing support is removably affixed to the plurality of platforms so that it may be rotated 180 degrees to allow the platforms to be used on either side of the article of furniture.

The present invention also pertains to a method for assisting an individual having compromised mobility and/or leg strength to lift their legs onto an article of furniture. The method is comprised of positioning the step assembly flush against the article of furniture with the securing support disposed between opposed surfaces of the article of furniture. The step assembly has at least two horizontal platforms, further comprising a first and second edge, wherein the first and second edges are perpendicular to each other. The second edge of each horizontal platform is positioned along the outer perimeter of at least one article of furniture and the step assembly is fully elevated above ground level. Sitting upright on the top surface of the article of furniture, adjacent to the perimeter or side of the article of furniture, the user's posterior is fully supported by the top surface of the article of furniture with their feet at ground level adjacent the step assembly. The user may adjust from an upright sitting position to side-lying, by raising the user's lead foot and trail foot to the lower-most horizontal platform of the step assembly while simultaneously lowering their trunk into sidelying so that their body is in a parallel position on the article of furniture. In this position, the user's head is placed towards one end of the article of furniture. The user then lifts their leading foot to the next higher horizontal platform and subsequent higher platforms until they reach the top surface of the article of furniture. Simultaneously, the user lifts their trailing foot from the bottom horizontal platform and subsequently lifts the trailing foot to the next higher horizontal platform and subsequent higher platforms until they reach the top surface of article of furniture. The user may then log-roll to a supine position on the article of furniture.

The method further comprises descent from the article of furniture. The user adjusts from side-lying to sitting upright on the article of furniture. By lowering the user's leading foot to an upper-most horizontal platform and subsequently lowers their leading foot to the next lower horizontal platform until they reach ground level. Simultaneously, the user lowers their trailing foot to the upper-most horizontal platform and subsequently lowers the trailing foot to the next lower horizontal platform until they reach the ground level.

BRIEF DESCRIPTION OF THE DRAWINGS

A more complete and thorough understanding of the various embodiments and advantages of the present invention may be acquired by referring to the following description taken in conjunction with the accompanying non-limiting drawings, wherein.

DETAILED DESCRIPTION

The following description details an apparatus and method for assisting a user in ascending or descending to and from an elevated surface, with reference to the accompanying Figures. More particularly, it pertains to an apparatus that assists a user to raise their legs onto and off of at least one article of furniture, including, but not limited to, beds, couches, sofas, futons, sofa beds, ottomans, cushions, cushion supports, mattresses, box springs, pallets, hospital beds, bed frames, futon frames, and the like.

The apparatus may be affixed flush against the bed with the securing support disposed between opposed surfaces of the article of furniture. The apparatus comprises a plurality of platforms elevated fully off the ground, hereinafter referred to as the step assembly, and a securing support is connected to a platform on one end, with the other end disposed between the opposing, contacting surfaces of at least one article of furniture. The at least one securing support is in a cantilevered configuration relative the at least one article of furniture, thereby allowing the step assembly to sit flush along the perimeter or side of an article of furniture. The securing support may be placed, disposed, and/or retained between any two opposed, contacting surfaces, whereby gravitational and/or frictional forces restrict or minimize movement of the securing support. Cushions include, but are not limited to, mattresses, mattress pads, mats, couch cushions, cots, futons, and the like. The securing support is removably affixed to the step assembly so that it may be rotated up to 180 degrees to allow the platforms to be used on either side of the sleeping or sitting article of furniture. The present disclosure is intended to be an example of the invention and the figures and descriptions provided are not intended to be limiting to any specific embodiment. The intended user of this apparatus includes, but is not limited to, individuals of decreased lower extremity strength, geriatric individuals, individuals with limited mobility, individuals suffering neurological diseases, individuals during post-surgery, post stroke, or another ailment recovery can use this device.

Figure 1:
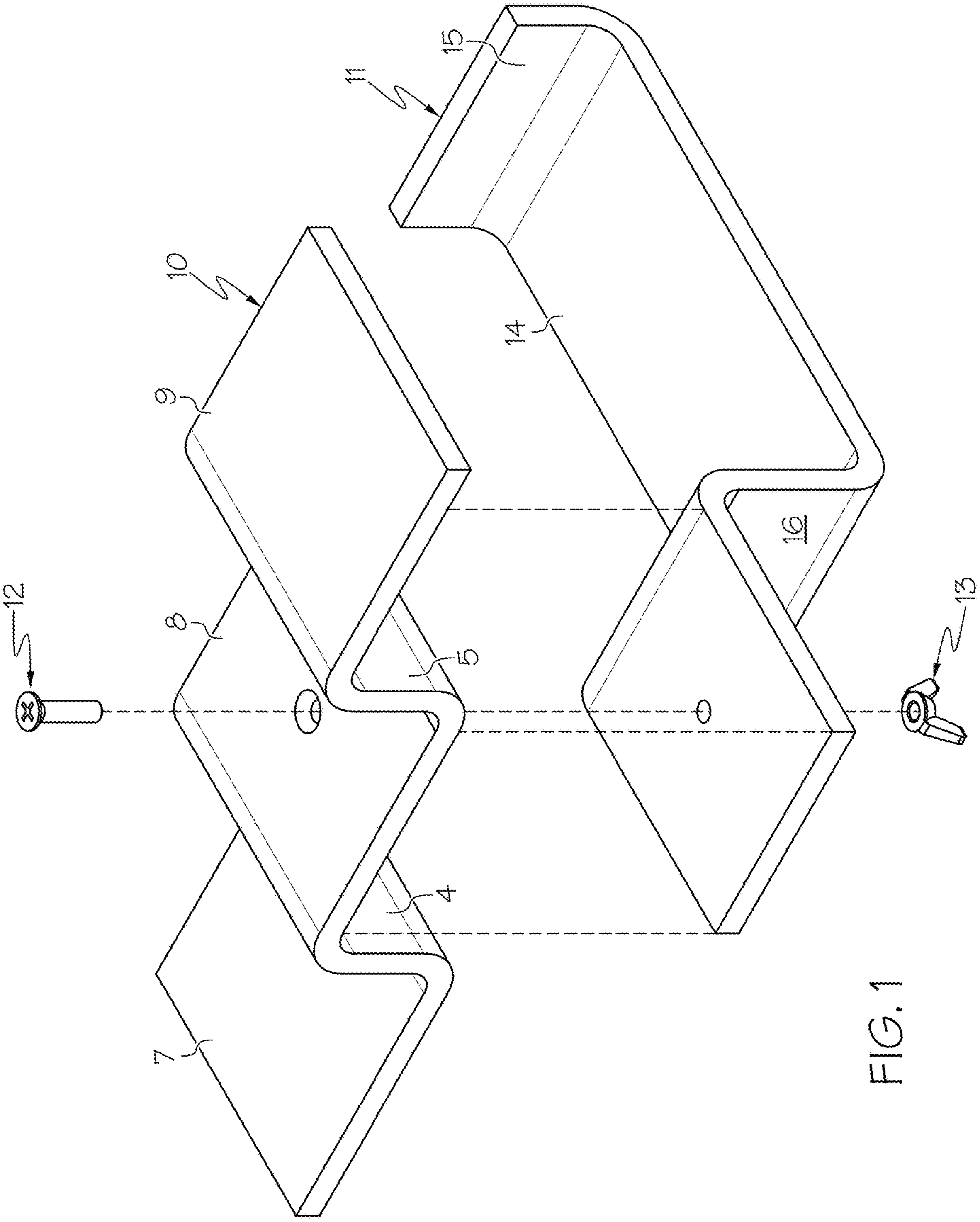
FIG. 1 is an exploded view perspective of one example of a sequential platform device for assisting in maneuvering one's legs into bed according to various embodiments of the present invention.

FIG. 1 represents an exploded view of the step assembly. As shown, the step assembly 10 is comprised of three conjoined platforms 7, 8, 9 of comparable size, which are connected by vertical connectors 4, 5. Platforms 7, 8, 9 are of sufficient size and depth to allow the supported positioning of the user's foot. The platforms 7, 8, 9 should not be construed to be limited to a specific number of platforms and may include platforms of varying size, width, depth, and thickness. The vertical connectors 4, 5 may include, but are not limited to, risers, articulating links, linkage bars, support rods, kick plates, stringers, beams, and other structural supports.

In a preferred embodiment, the lowest-most of the three ascending platforms 7 is slightly larger than the subsequent two higher platforms 8, 9 which are of equal size. In this embodiment, the lower-most platform 7 has room for both heels of the user while the other platforms 8, 9, contain room for just one heel of the user. The preferred embodiment of the step assembly 10 is constructed from molded plastic, such as, but not limited to, acrylics or nylon, between ¼ inch and ½ inch in thickness, though other materials, material thicknesses, and casting processes including injection molding can be utilized. The surface of the platforms 7, 8, 9 may be textured or made of material with varying elevations, such as, but not limited to, rubber, plastic, foam, adhesive material, textile, fibers, anti-slip paints or coatings, or molded patterned materials, such as, but not limited to pebbled or cross hatched patterns, and the like. The surface of the step assembly 10 or platforms 7, 8, 9 may also be covered in a non-skid, detachable surface, such as, but not limited to an adhesive, rubber, carpet, fabric or other textile, foam, flooring, non-skid tape or pallet paper, or other material may be applied after manufacture of the step assembly 10 and designed to allow increased friction between the surface of the platform 7, 8, 9 and the user's foot. Detachable surfaces may be connected to the platforms 7, 8, 9 through various mechanisms, such as, but not limited to, snap mechanisms, buttons, hook and loop fasteners, hook fasteners, clip fasteners, pin fasteners, tie fasteners, elastic fasteners, and the like. The step assembly 10 and platforms 7, 8, 9 may consist of curved edges to prevent scratches, cuts, or the like on user.

An embodiment of the device shown in FIG. 1, comprising of a rectangular, rigid securing support that will be referred to as a securing support 11. The securing support 11 is shown with an extension member 14 on one end with a surface of sufficient size to support the middle platform 8 of the three conjoined platforms 7, 8, 9. In other embodiments, the securing support 11 may directly support either of the other depicted platforms 7, 9, or any number of platforms not depicted in this embodiment. In this embodiment, a small extension member 14 with a 90-degree bend creates a protrusion 15 at the distal end of the extension member 14. The extension member 14 is intended to be inserted between opposing surfaces of one or more articles of furniture. This extension member 14 is meant to improve retention of the securing support 11 between the surfaces. The extension member 14 may be of various shapes and sizes, so long as it is able to sufficiently support the platform or platforms connected thereto. Additional securing supports 11 may also be utilized in alternative embodiments. Additionally, the protrusion 15 may be of different heights, thicknesses, shapes, widths, materials, angles, and/or directions relative to the surface of the extension member 14. Protrusions 15 in alternative embodiments may also be situated in different locations within the extension member 14.

The securing support 11 of this embodiment includes a vertical central component 16, which is determinative of the height at which the step assembly 10 will sit relative to the article of furniture. The height and direction of the vertical central component 16 may alter the height at which the step assembly 10 sits relative to the article of furniture. Alternate embodiments of the securing support 11 may lack this vertical central component 16, such that the central portion of the securing support 11 is substantially planar.

The securing support 11 is affixed to the inferior surface of the middle platform 8 by a single flathead machine screw 12 and held in place by a wing nut 13. Metal screws, plastic screws, and wing nuts can be utilized, as well as other methods of affixation including, but not limited to, bolts, pegs, latches, screws, hooks, nails, nuts, locks, and male/female fasteners. This design allows for the screw to be loosened and the securing support 11 to be rotated up to 180 degrees on the inferior surface of the tread of middle platform 8 to permit use on either side of the article of furniture. Other embodiments of the attaching mechanism include two or more screws or a spring-loaded locking swivel system. When secured, the securing support 11 is preferably arranged perpendicular to the step assembly 10 connected thereto. The exposed end of the securing support 11, herein after referred to as the extension member 14, is slid between two opposing surfaces of an article of furniture, such as a mattress and a box spring, supporting the conjoined platforms 7, 8, 9 along the edge or perimeter of the article of furniture. In this embodiment the same plastic is used for both the step assembly 10 and the extension member 14, though other materials of varying strength, durability, and coefficients of friction can be used.

Figure 2:
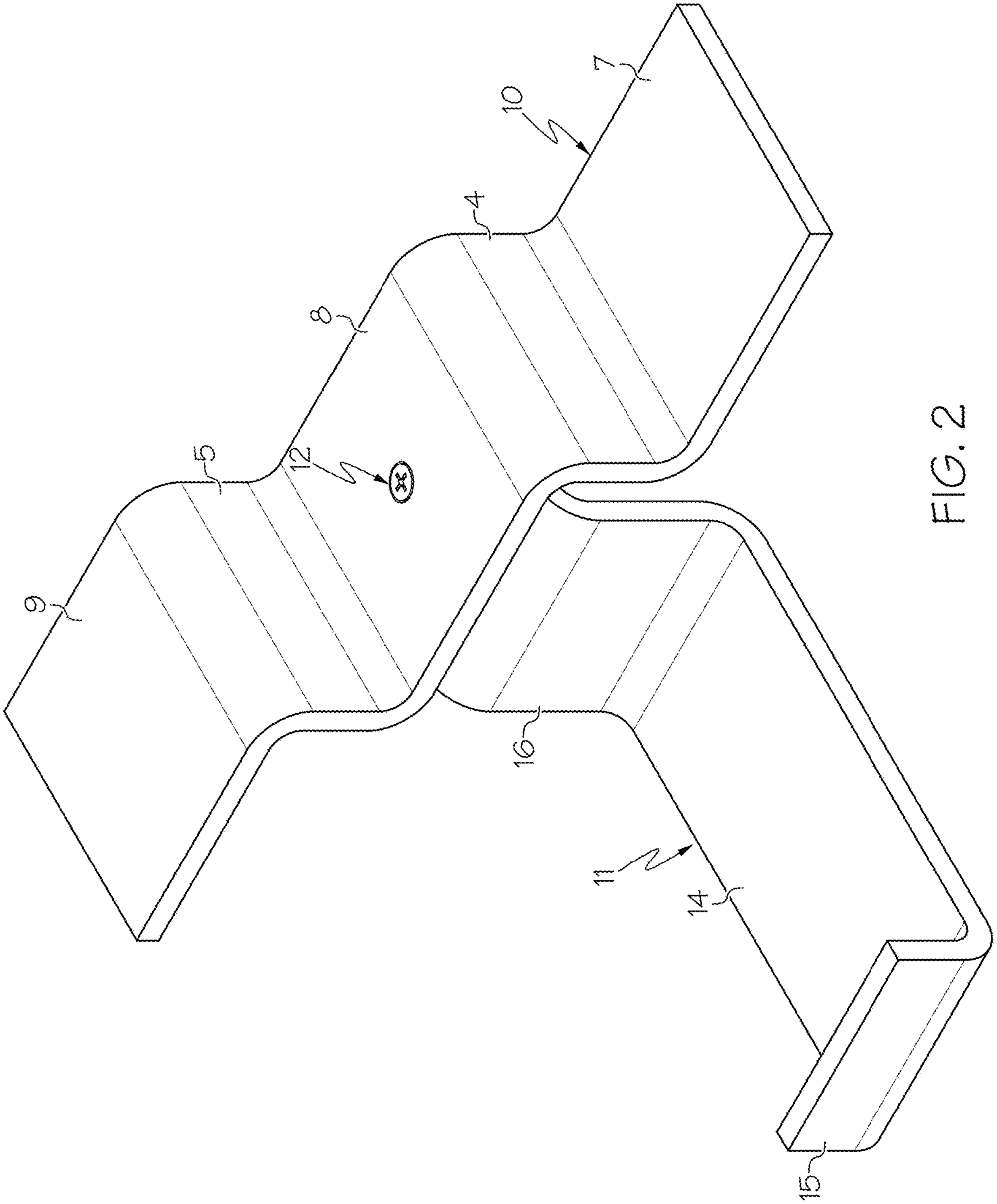
FIG. 2 is a perspective view of the device according to various embodiments described herein.

FIG. 2 depicts three conjoined platforms 7, 8, 9 of comparable size, supported by a securing support 11, and secured by a flat head machine screw 12. The platforms 7, 8, 9 are connected by two vertical connectors 4, 5. In this embodiment, the inferior surface of the middle platform 8 is supported on the superior surface of one end of the securing support 11. The opposing end of the securing support 11 is depicted as terminating in an extension member 14 with a 90-degree protrusion 15. The extension member 14 is meant to be inserted between two opposing surfaces of an article of furniture, typically a mattress and box spring, supporting the step assembly 10 along the edge of the mattress and aiding in stability and retention.

Figure 3:
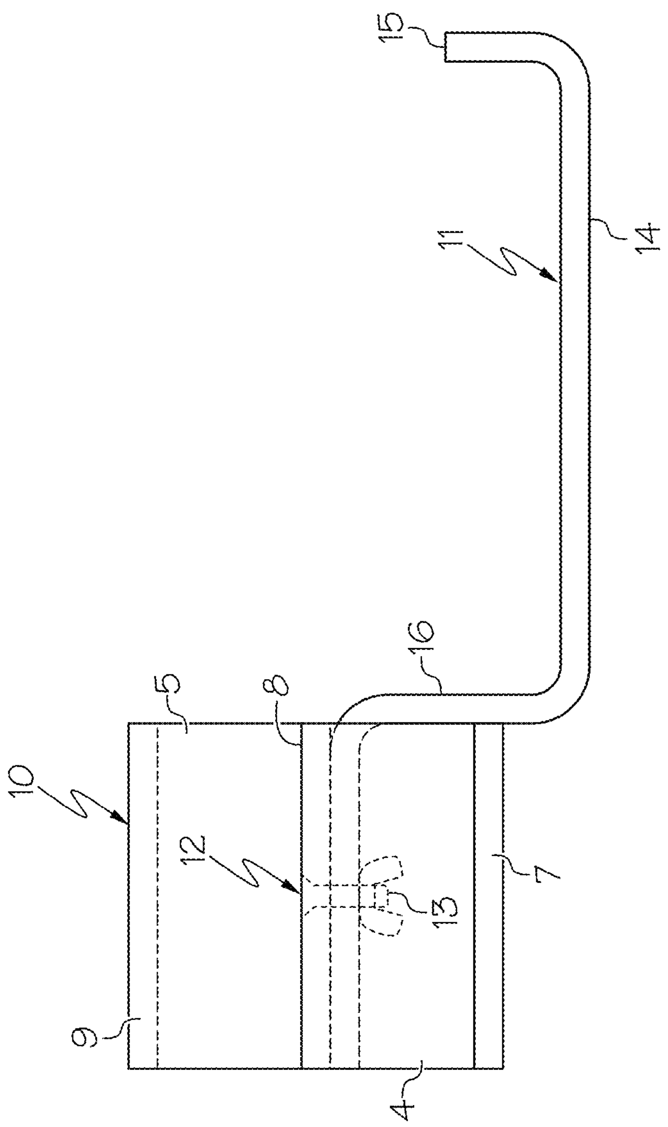
FIG. 3 is a side view the device according to various embodiments described herein.

FIG. 3 depicts a side view perspective of the step assembly 10 comprising platforms 7, 8, 9 attached to each other with vertical supports 4, 5 with comparable platform 7, 8, 9 and vertical connector 4, 5 size depicted in cross section to allow viewing of the securing support 11 affixed to the middle platform 8 by a single flathead machine screw 12 and wing nut 13 combination. Different securing support 11 lengths relative to the size of the step assembly 10 can be utilized. The terminal end of the extension member 14 may be of differing shapes, including, but not limited to, rounded shapes, T-Shaped, L-shaped, and varying angles. The surface of the securing support 11, extension member 14, and protrusion 15 may be flat or have varying elevations and the surfaces may include, but are not limited to, textured, smooth, rough, bumpy, sticky, slick, coarse, rugged, irregular, or tacky. The surface area of the extension member 14 may comprise a series of raised nubs, pebbles, cross-hatching, bulges, depressions, notches, teeth, tacky material, or the like, creating elevation and additional friction to aid in retention between the opposed surfaces.

Figure 4:
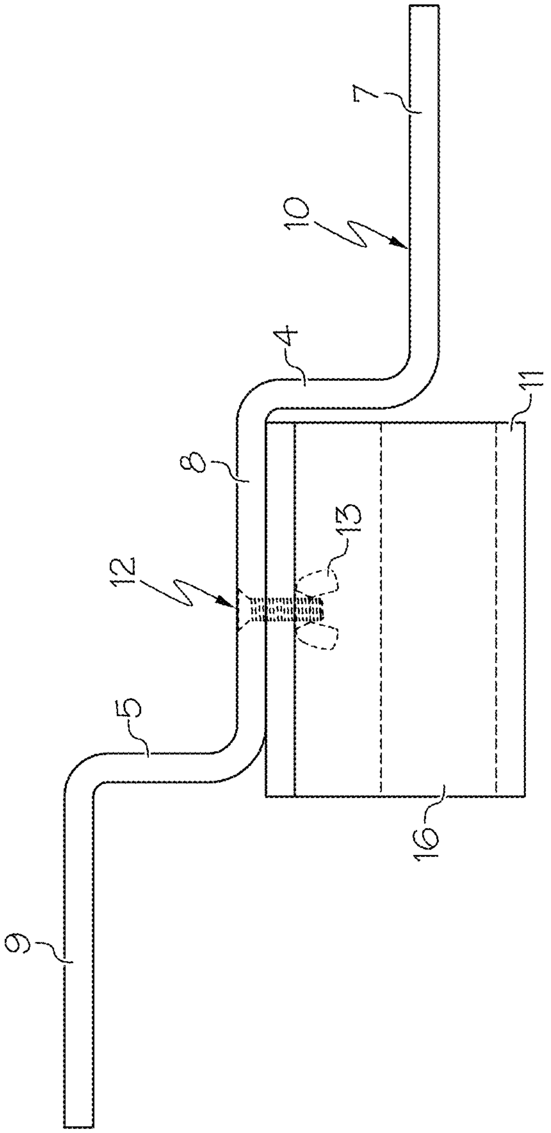
FIG. 4 is a front view the device according to various embodiments.

FIG. 4 depicts a front view of the step assembly 10 comprising a plurality of platforms 7, 8, 9 with comparable platform size depicted as supported by a securing support 11 attached to the middle platform 8. The platforms 7, 8, 9 of the step assembly 10 are connected by vertical connectors 4, 5. The platforms 7, 8, 9 and securing support 11 are depicted as being secured by a single flat head machine screw 12 and wing nut 13. The extension member 14 of the securing support 11 is depicted as having a width greater than the length of the middle platform 8, though other comparative ratios can be utilized, including, but not limited to, a securing support 11 with a width smaller than the length of the middle platform 8. In this embodiment, the platforms 7, 8, 9 are of uniform size, though non-uniform sized platforms can be utilized to the same effect.

Figure 5:
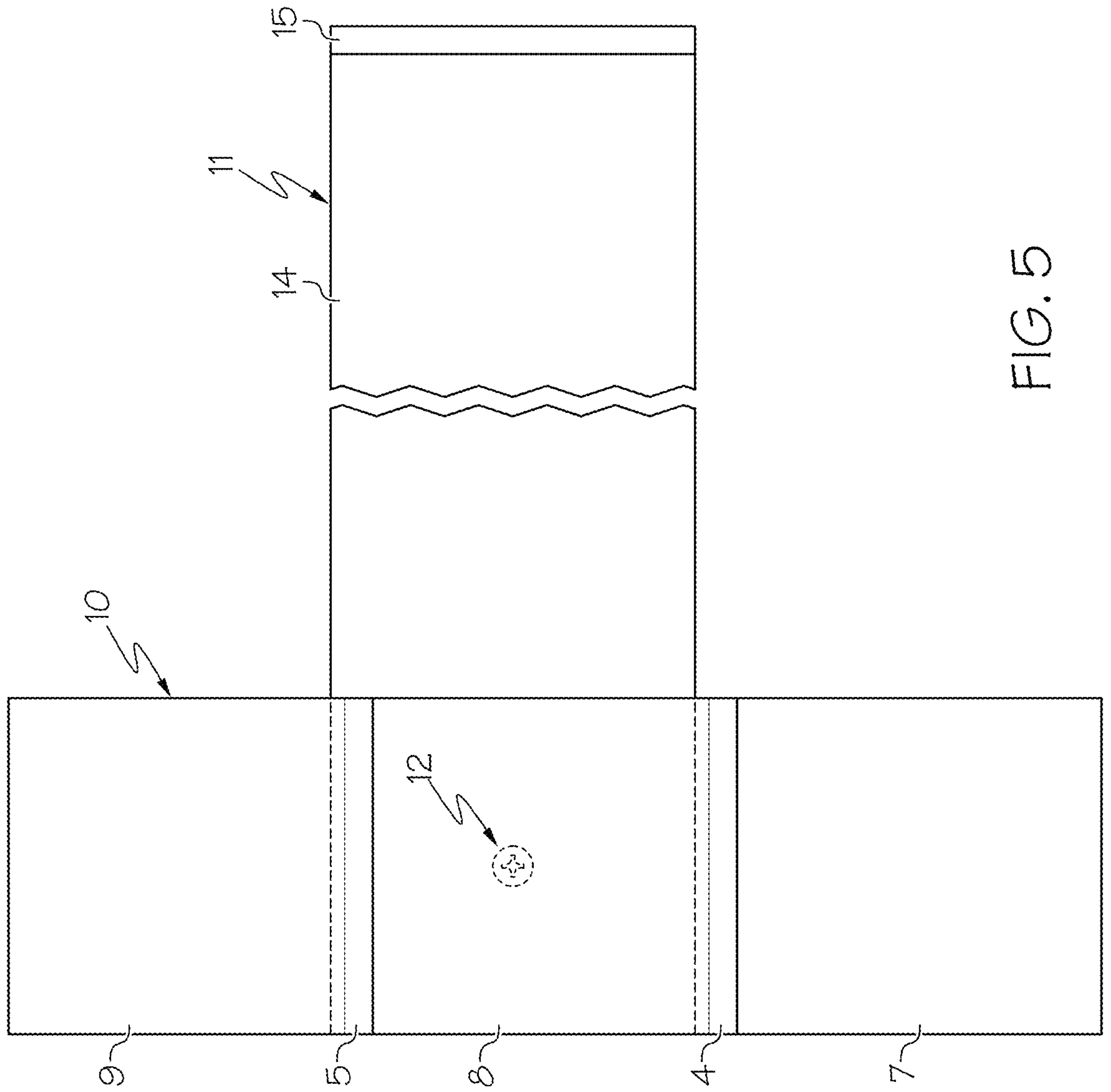
FIG. 5 is a top view of one embodiment of the device.

FIG. 5 depicts a top view of the step assembly 10 with the middle platform 8 of the plurality of platforms 7, 8, 9 affixed to the securing support 11 by a single flat head machine screw 12. The platforms 7, 8, 9 of the step assembly 10 are connected by vertical connectors 4, 5. In this embodiment, the vertical connectors 4, 5 are risers. The horizontal surface of the platforms 7, 8, 9 are shown to be of equal length and width, though variable platform size designs can be utilized. In alternate embodiments, the lowest-most platform 7 is larger than the other two platforms 8, 9. Additional platforms may be added with varying ratios of platform size.

Figure 6:
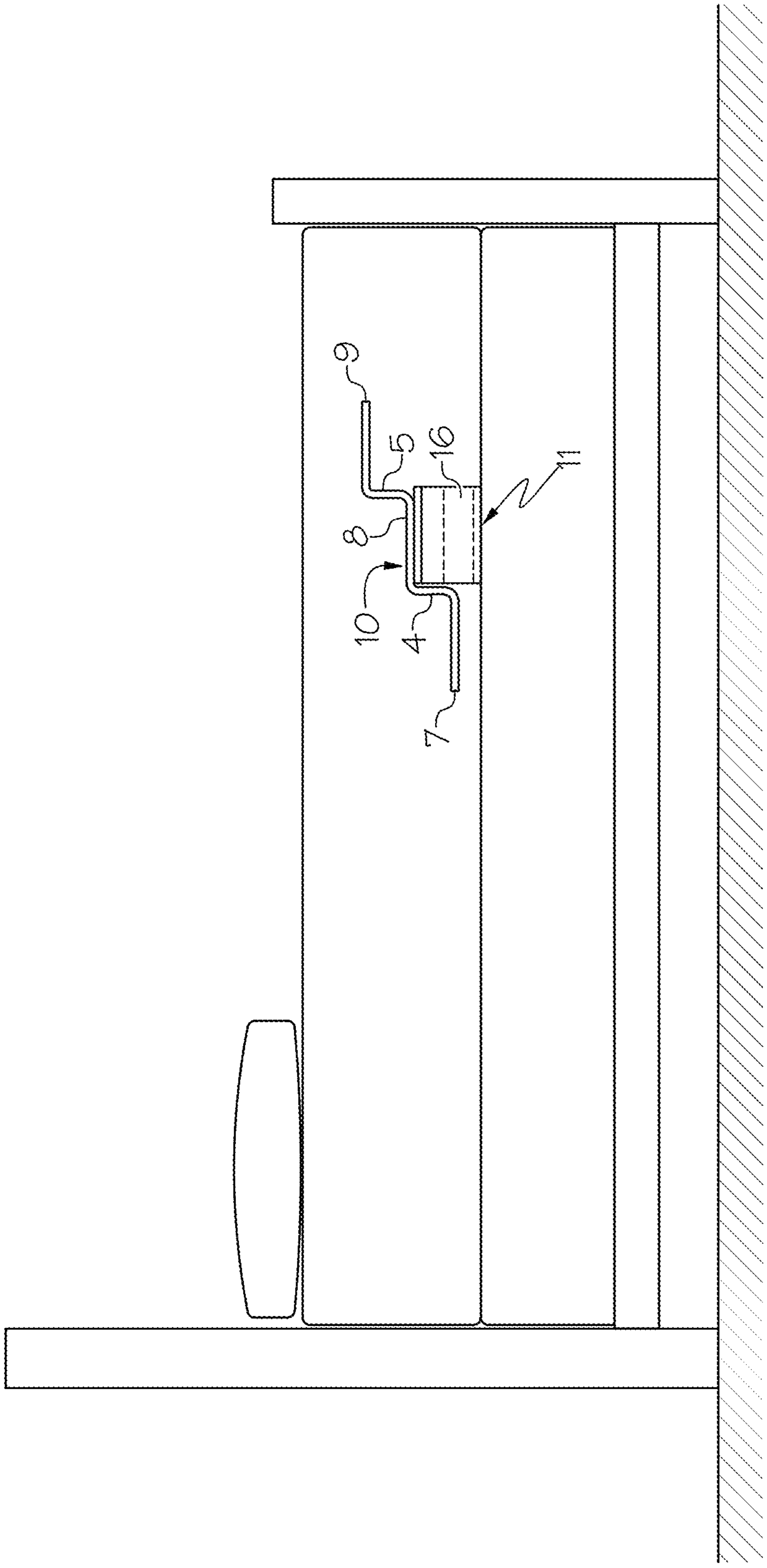
FIG. 6 is a side view of one example of a sequential mobility platform secured in place between the bottom surface of a mattress and the top surface of a box spring.

FIG. 6 depicts a side view of the step assembly 10 secured in a typical use position with the securing support 11 inserted between the opposing surfaces of an article of furniture, specifically an exemplary mattress and box spring. The step assembly 10 is supported by the inferior surface of the middle platform 8 on the superior surface of the securing support 11. The step assembly 10 is situated flush and parallel along the perimeter of one or more articles of furniture in a typical use position. In this embodiment, the step assembly 10 and platforms 7, 8, 9 are raised above the height intersection between opposed surfaces by a vertical central component 16 of the securing support 11. Other potential positions which are higher or lower relative to the intersection of the opposing surfaces of articles of furniture can be incorporated or utilized.

Further according to FIG. 6, a user would position the step assembly 10 by inserting the securing support 11 between the opposed surfaces of an article of furniture, resulting in the step assembly 10 being fully elevated above ground level. To ascend the step assembly 10 onto the article of furniture, the user sits upright on the top surface of the article of furniture adjacent to the perimeter of the article of furniture nearest the step assembly 10 location. The user begins the ascent by placing their feet on the lower-most horizontal platform 7. The user adjusts from a sitting to a sidelying position with their posterior toward a parallel position on the article of furniture. In this position, the user's feet approximate the step assembly 10 and the user's head approximates the article of furniture. The user continues the ascent by raising their leading foot to the next higher horizontal platform 8 followed by their trailing foot. This process continues to each next higher horizontal platform 8, 9 until both of the user's feet reach the top surface of the article of furniture. To situate the user on the article of furniture, the user may log-roll into a supine position. To descend from the article of furniture to the ground level, the user may begin at the upper-most platform 9 and subsequently lower the leading foot and trailing foot onto the next lower platform 8 until the user reaches the lower-most platform 7, followed by the ground level. At this point, the user can adjust from a sidelying position to a sitting position.

Figure 7:
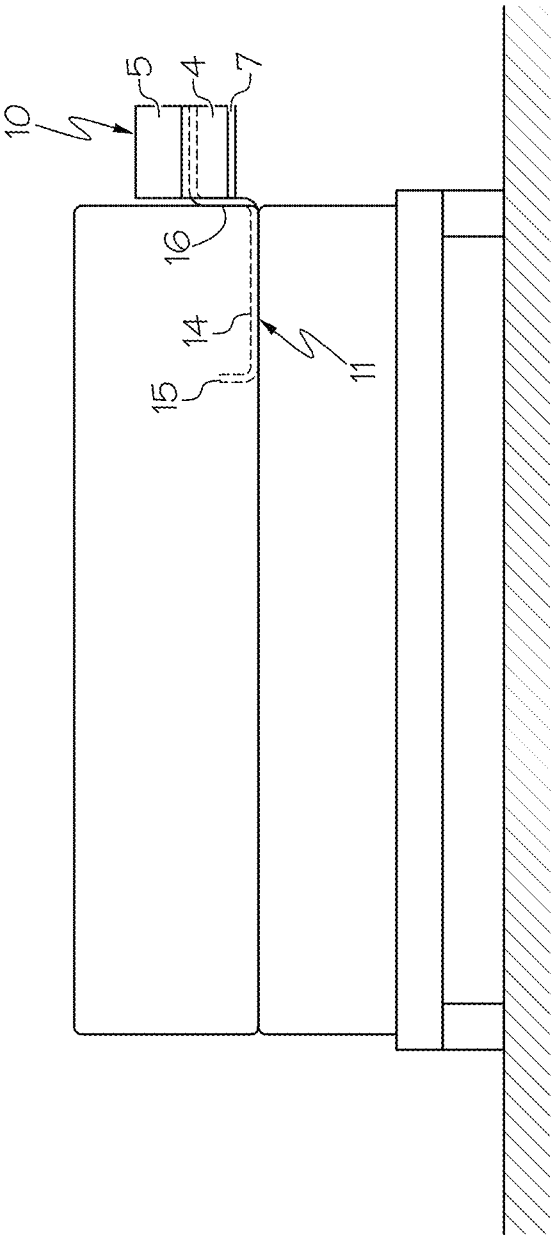
FIG. 7 is a front view of one example of a sequential mobility platform secured in place between the bottom surface of a mattress and the top surface of a box spring.

FIG. 7 depicts a front view of the step assembly 10 secured in typical use position with the securing support 11 inserted between the opposing surfaces of an article of furniture, such as a standard mattress and box spring. An extension member 14 with a protrusion 15 of the extension member 14 of the securing support 11 is depicted providing stability for the device. In this embodiment, the protrusion 15 is at a 90-degree bend at the terminal end of the extension member 14 to create a hook-shape. The protrusion 15 vertically connects to the opposed surface, thereby resisting movement of the device through frictional forces, particularly when the weight of the user is partially or completely on the device. A securing support's 11 length relative to the width of the step assembly 10 is shown, though this is not to be considered limiting of other contemplated lengths.

FIGS. 8A-8D depict an alternative preferred embodiment. As shown, the device is comprised of a step assembly 30, which further comprises at least two platforms 27, 28, 29 of comparable platform size. The platforms 27, 28, 29 of the step assembly 30 are connected by vertical connectors 24, 25. In this embodiment, the vertical connectors 24, 25 are risers. The vertical connectors 24, 25 may include, but are not limited to, articulating links, support rods, kick plates, stringers, beams, and/or other structural supports. The platforms 27, 28, 29 are of sufficient size and depth to allow the supported positioning of the user's feet. The lower-most platform 27 has a slightly larger surface area than the subsequent two platforms 28, 29 which are platforms 28, 29 of equal size. The lower-most platform 27 has room for both heels of the user. The middle platform 28 and upper-most platform 29 contain room for just one heel of the user. In alternate embodiments, the platforms 27, 28, 29 may be the same size or of different lengths and widths. The edge of the lower-most platform 27 of the step assembly 30 is covered by a soft bumper 22 to improve safety during use.

Figure 8A:
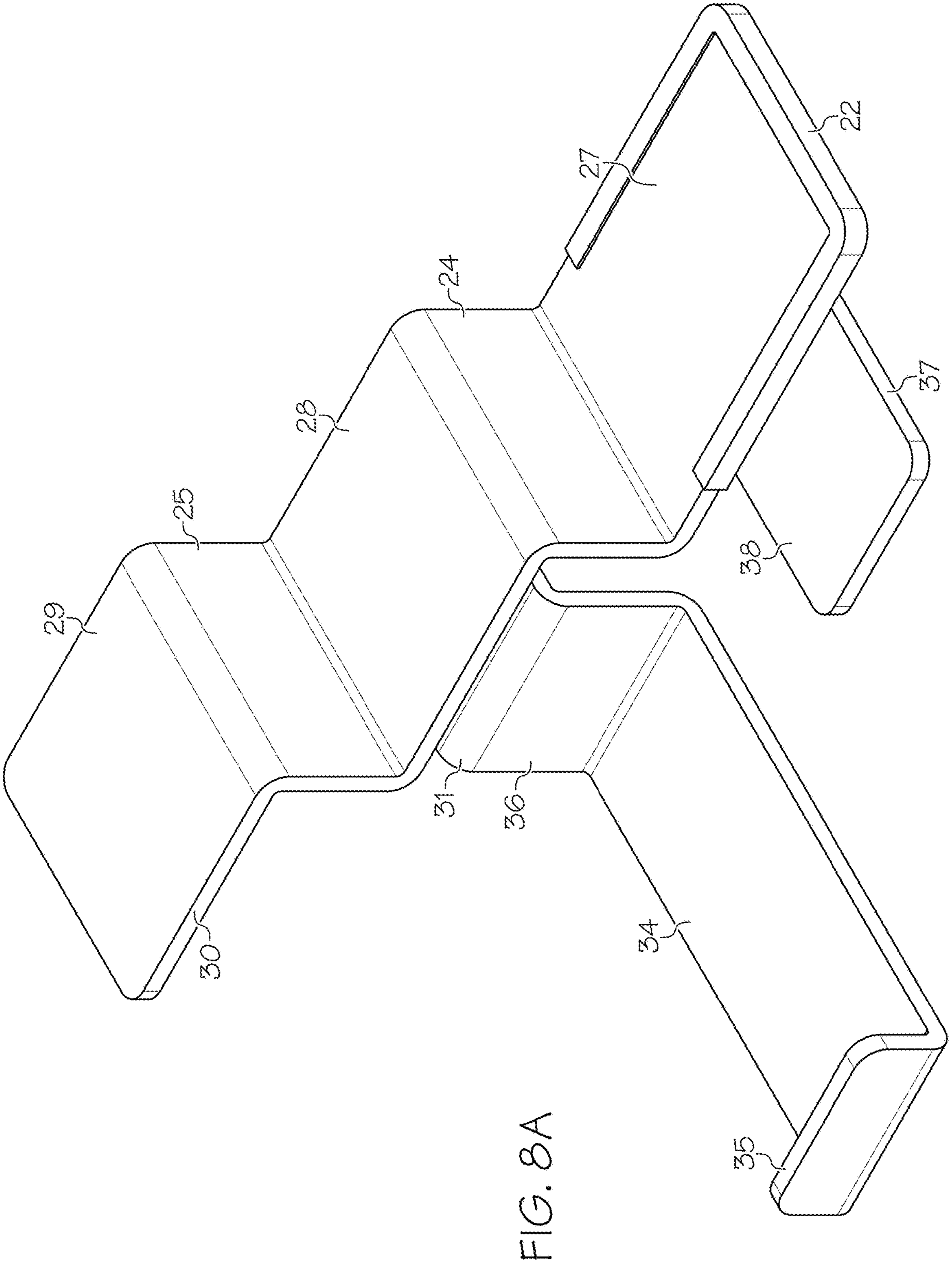
FIGS. 8A-8D are multiple perspectives of an alternate embodiment of the device comprising two securing supports and wherein the step assembly comprises three platforms.
Figure 8B:
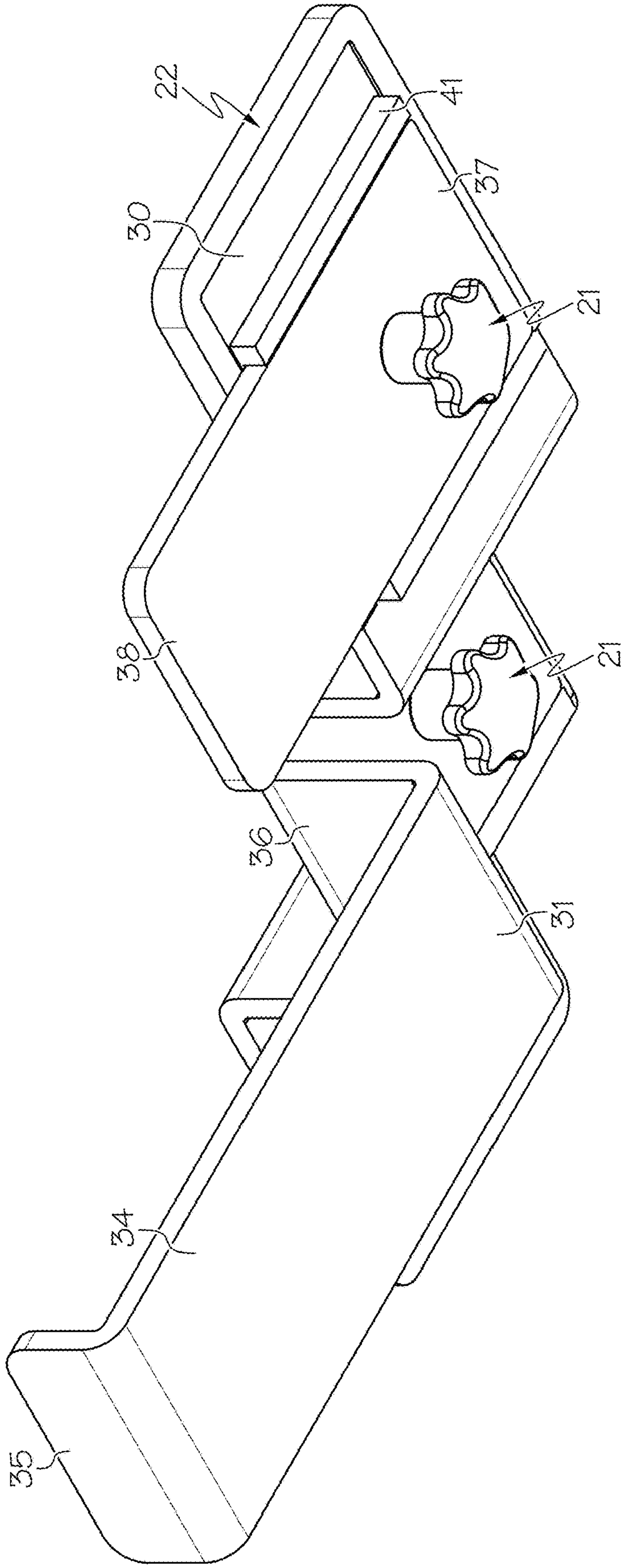
Figure 8C:
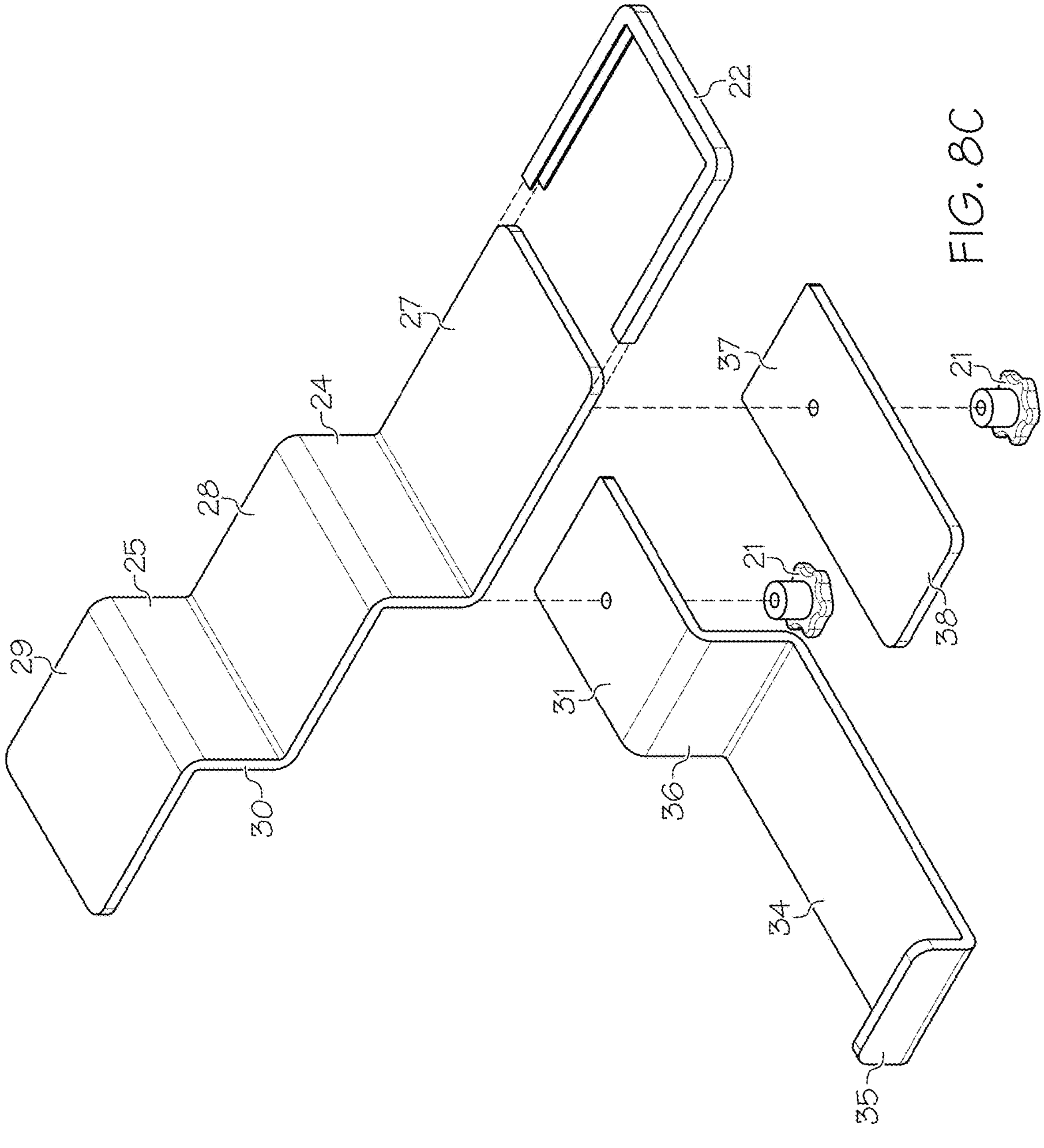
Figure 8D:
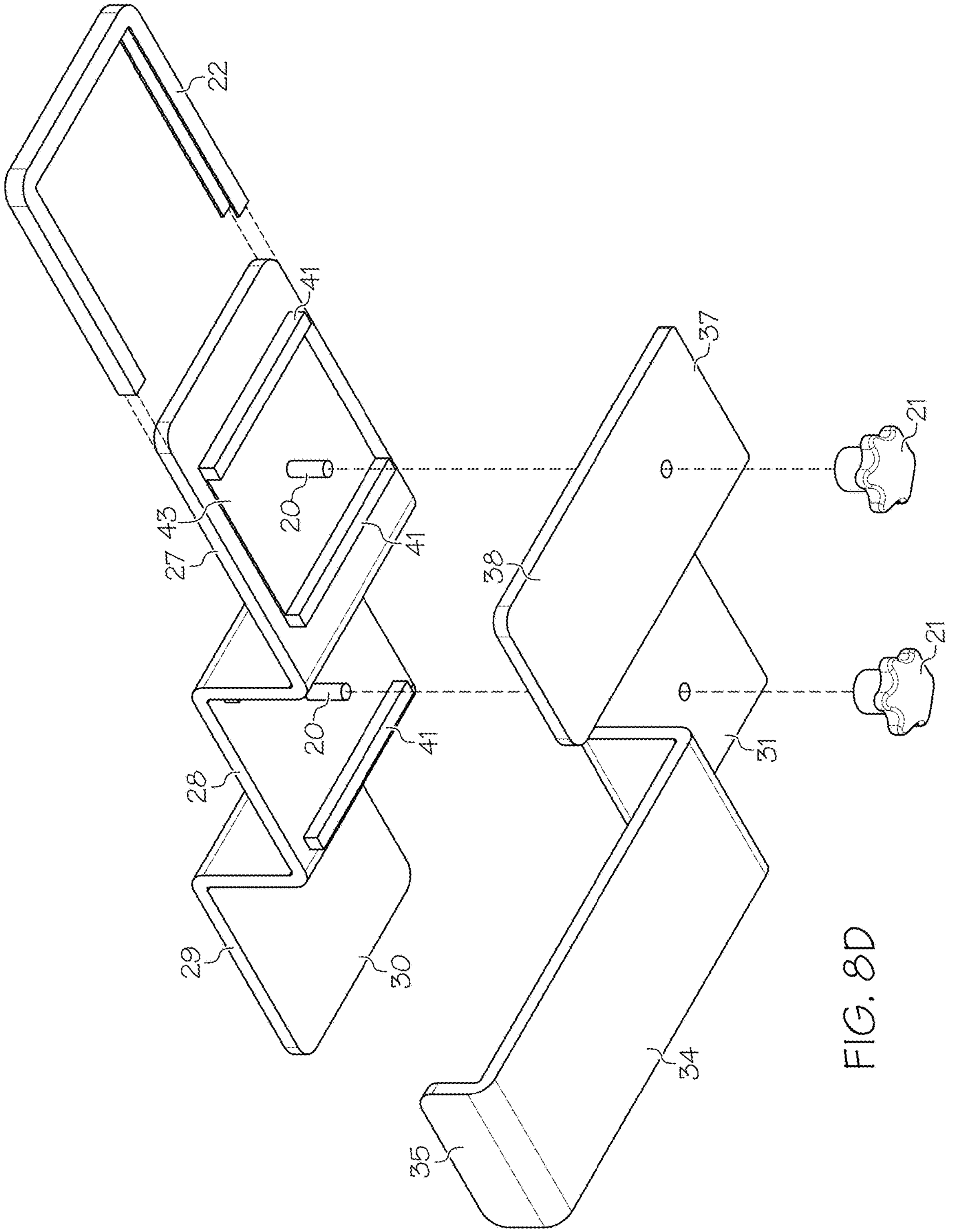

As shown in FIGS. 8B and 8D, the platforms 27, 28 comprise a track or guardrail 41 on the underside of the platform 27, 28. In this embodiment, the guardrails 41 create a receptacle 43 on the underside of the platforms 27, 28 and are preferred to be about ¼ inch thick, however, varying thicknesses may be utilized. The guardrails 41 are spaced to receive the width of the primary securing support 31 and the secondary securing support 37. Sliding tracks may also be utilized in place of guardrails 41 to similarly receive the securing supports 31, 37 and limit rotation around the point of connection between the step assembly 30 and the securing supports 31, 37. In this embodiment, the guardrails 41 are equally and uniformly sized and spaced on platforms 27, 28. Alternately guardrails may be placed on the bottom of all platforms 27, 28, 29, so that securing supports 31 and 37 might be attached to any platform. Both the primary securing support 31 and secondary securing support 37 are of uniform width, such that the securing supports 31, 37 may be situated within any of the uniform receptacles 43. In other embodiments, the size, shape, spacing, or width of the receptacles 43 are not uniform across all platforms 27, 28, 29, such that the primary and secondary securing supports 31, 37 must be coupled to specific platforms 27, 28, 29.

A secondary component of the device shown in FIGS. 8A-8D, are comprised of two securing supports 31, 37 made of a rectangular piece of material and will be referred to as the primary securing support 31 and the secondary securing support 37. In all embodiments, at least one securing support has a protrusion 35. When there is more than one securing support 31, 37 in an embodiment, the primary securing support 31 will consistently comprise at least one protrusion 35 on the surface of the primary extension member 34. Securing supports 31, 37 of various embodiments may have more than one protrusion 35 as well as protrusions 35 in various directions and various placements on the extension member 34. Additional securing supports 31, 37 of various embodiments, such as the secondary securing support 37 of the embodiments depicted in FIGS. 8A-8D, may comprise a protrusion 35 or may be substantially planar without a protrusion. In this embodiment, the primary securing support 31 comprises vertical central component 36 and a primary extension member 34. The primary extension member 34 has a vertical protrusion 35 at its terminal end, which is perpendicular to the surface of the primary extension member 31. The protrusion 35 stretches the full width of the primary extension member 34. Protrusions 35 need not span the full width of the extension member 34, 38 and may vary in a multitude of ways, such as, but not limited to, width, length, thickness, shape, curvature, direction, angle, height, and the like. Protrusions 35 may protrude below or above the surface of the extension member.

The primary securing support 31 with one or more protrusions 35 is shown in this embodiment with an S-shape. The primary extension member 34 with the protrusion 35 has a surface of sufficient size to the support the middle platform 28 of the step assembly 30. In this embodiment, the primary extension member 34 at the distal end of the primary securing support 31 with a protrusion 35 is intended to be inserted between opposing surfaces of the article of furniture, such as a mattress and box spring. The secondary securing support 37 is attached to the lowest-most platform 27 of the three platforms 27, 28, 29 to offer additional support. The securing supports 31, 37 may be inserted between or within articles of furniture upon which a user can sit or lay on. The primary extension member 34 and protrusion 35 are meant to improve retention of the securing support 31 between these surfaces. The secondary securing support 37 of this embodiment allows the user to place more weight on the lower-most platform 27 and the step assembly 30 overall. The additional surface area provided by the secondary extension member 38 of the secondary securing support 37 distributes weight and balances the device when the weight of the user is concentrated on a single platform 27, 28, 29.

The two securing supports 31, 37 are affixed to the inferior surface of the respective platforms 27, 28, 29 by a screw or threaded peg 20 projecting from the bottom of the first and second platforms 27, 28 and held in place by a plastic nut 21. The middle platform 28 is connected to the primary securing support 31 with the protrusion 35. In this embodiment, the lower-most platform 27 is connected to the secondary securing support 37, which is planar and lacks a protrusion. The plastic nut 21 of this embodiment is of respectable size such that it allows users to easily grip and rotate the nut 21 without need for additional tools. More specifically, this is beneficial to individuals with dexterity issues and allows gripping of the nut 21 and rotating to screw the nut 21 until the securing supports 31, 37 are fixed in place. This design allows for the nut 21 to be loosened and both securing supports 31, 37 to be detachable and can be rotated 180 degrees relative to the step assembly 30 to permit use on either side of the article of furniture. In this alternate embodiment, a bumper 22 may be slidably connected, removed, and re-attached to the outer edge of the lower-most platform 27.

FIGS. 9A-9D represent a view of an alternate embodiment of the device. As shown, the step assembly 30 comprises of two platforms 28, 29 of comparable size, joined by a vertical connector 25. While the two platforms 28, 29 are shown to be the same size, the lower-most platform 28 may also be longer than the upper-most platform 29. Platforms 28, 29 are of sufficient size and depth to allow the supported positioning of the user's foot. The primary securing support 31 is shown with an extension member 34 on one end with a surface of sufficient size to support the upper-most platform 29 of the step assembly 30. A small 90-degree bend creates a protrusion 35 at the distal end of the primary extension member 34 which is intended to be inserted between opposing surfaces of articles of furniture. The primary securing support 31 includes a vertical central component 36, which is determinative of the height at which the step assembly 30 will sit relative to the article of furniture. A secondary securing support 37 comprises a secondary extension member 38 having a planar configuration. The secondary securing support 37 of this embodiment allows the user to place more weight on the lower-most platform 28 and the step assembly 30 overall. The primary securing support 31 is affixed to the higher-most platform 29, and the secondary securing support 37 is affixed to the lower-most platform 28 by a single threaded peg 20 and held in place by a plastic nut 21. Metal screws, plastic screws, and wing nuts can be utilized, as well as other methods of affixation including, but not limited to, bolts, pegs, latches, screws, hooks, nails, nuts, locks, and male/female fasteners. This design allows for the nut 21 to be loosened and the securing supports 31, 37 to be rotated up to 180 degrees on the inferior surface of the platforms 28, 29 to permit use on either side of the article of furniture.

Figure 9A:
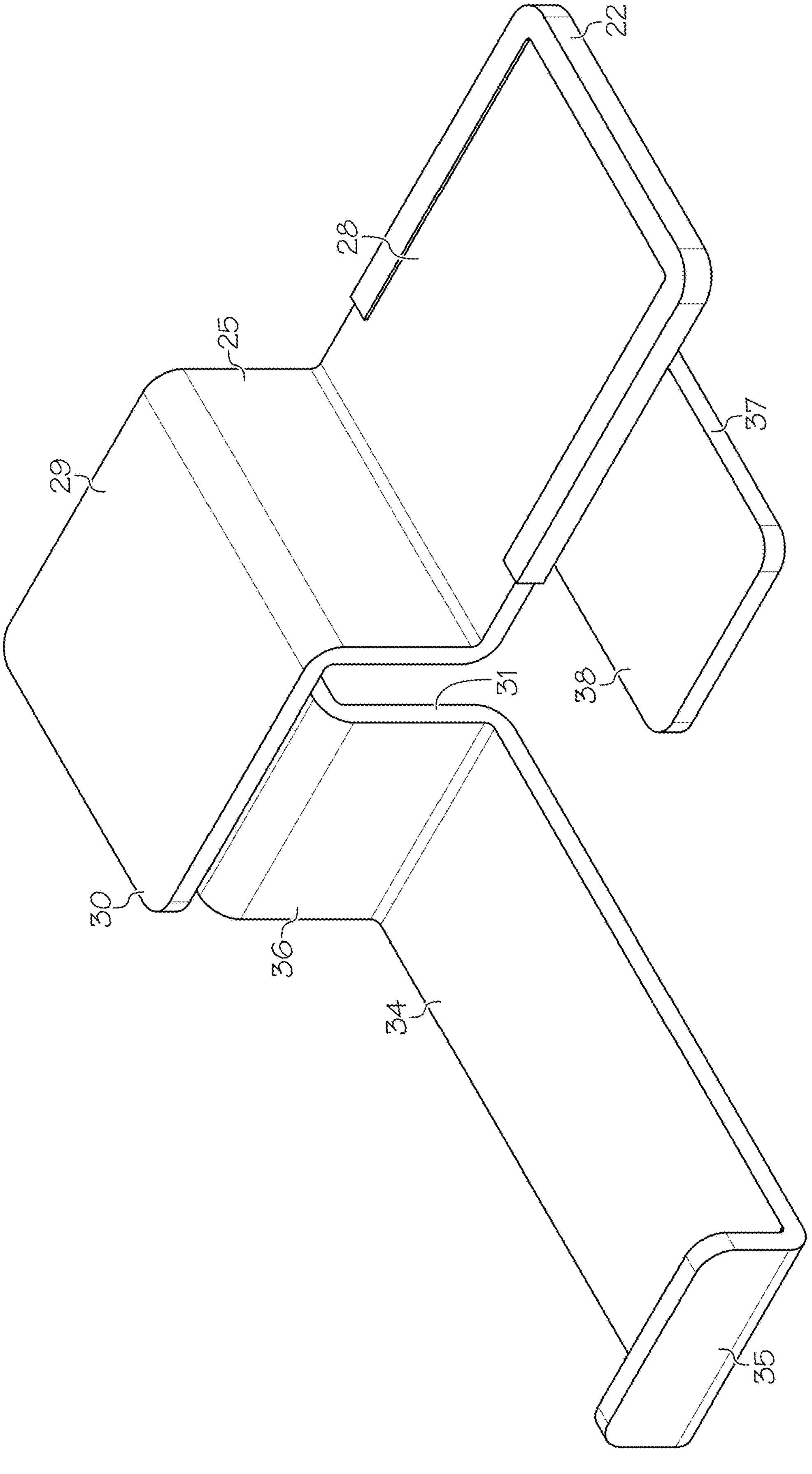
FIGS. 9A-9D are multiple perspectives of an alternate embodiment of the device comprising two securing supports and wherein the step assembly comprises two platforms.
Figure 9B:
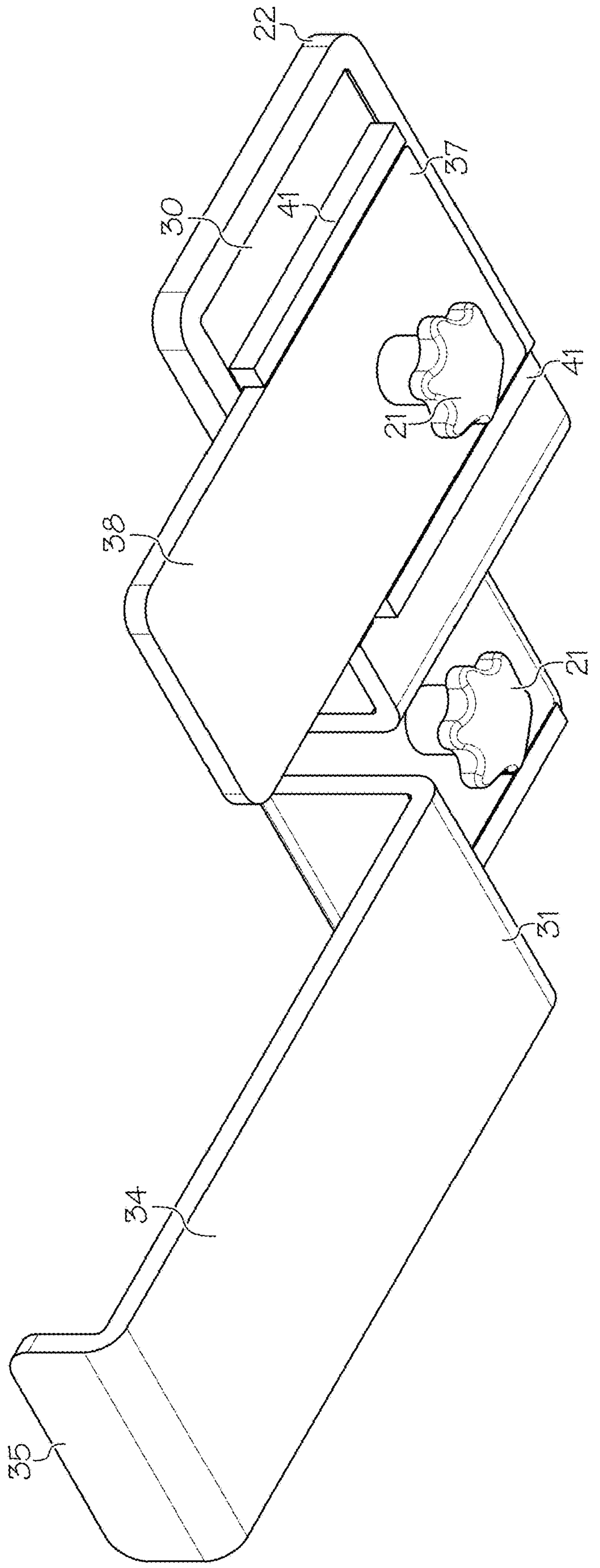
Figure 9C:
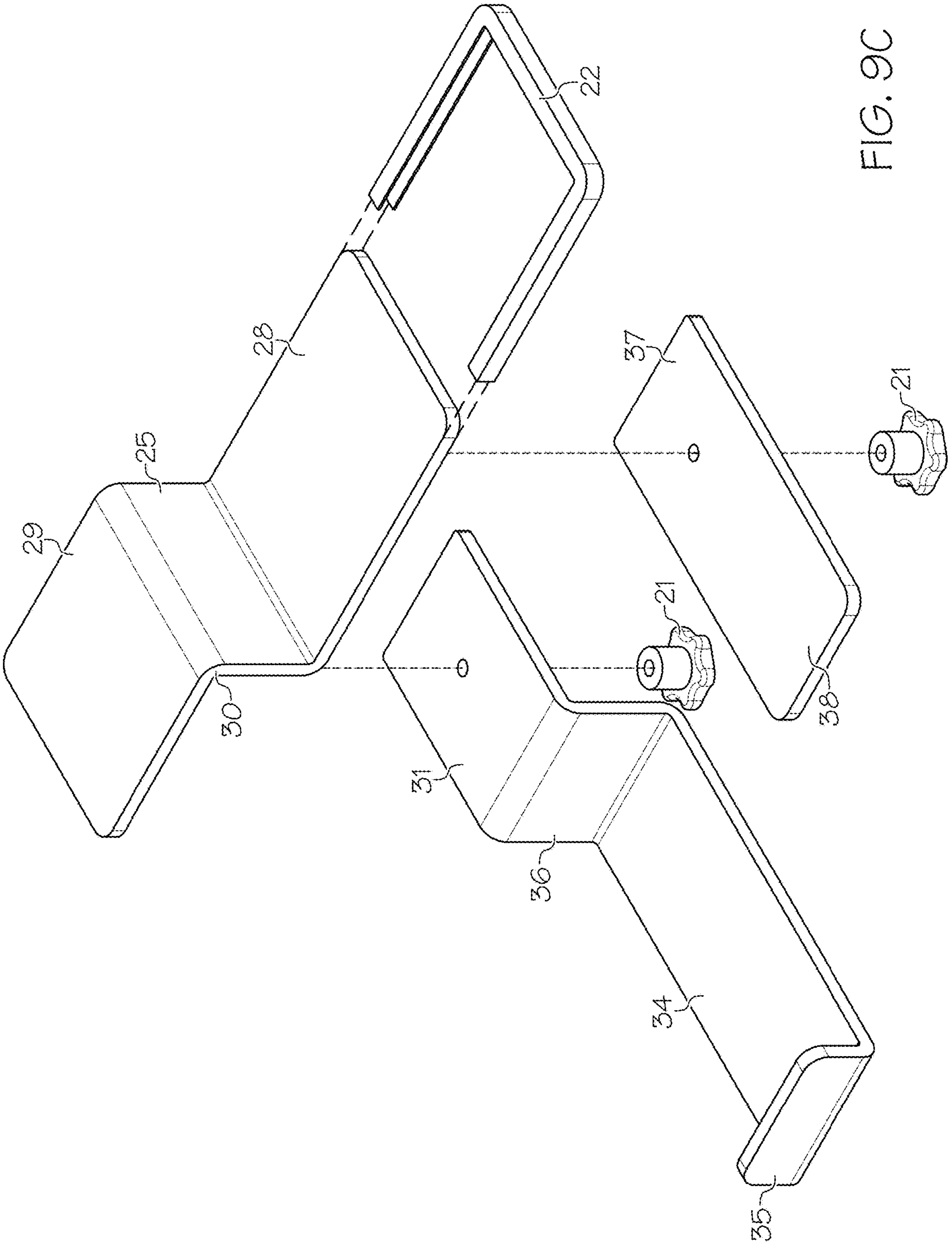
Figure 9D:
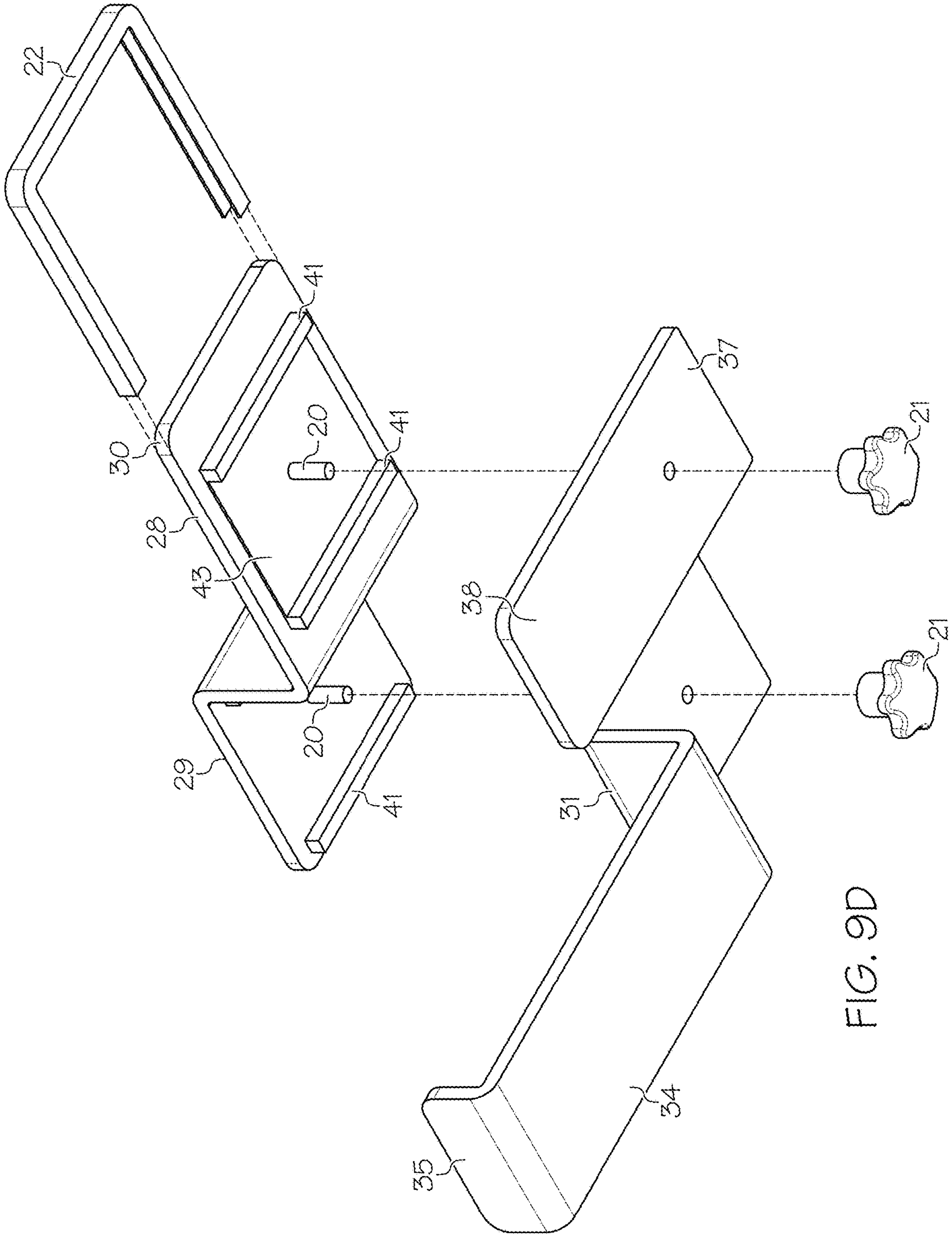

FIGS. 9B and 9D depict the bottom view of the step assembly 30. Both platforms 28, 29 further comprise receptacles 43 to prevent the step assembly 30 from rotating on the primary or secondary securing support 31, 37. In this embodiment depicted in FIGS. 9B and 9D, the guardrails 41 are preferred to be about a ¼ inch thick, however, varying thicknesses can be utilized. The guardrails 41 are spaced to receive the width of the primary securing support 31 and secondary securing support 37. A divot, indent, cavity, inward projection 42, or other receptacle 43 on the underside of platforms 28, 29 has been considered and will function equivalently to the guardrail 41.

FIGS. 10A-10D represents a view of an alternate embodiment of the step assembly device. As shown, the step assembly 30 is comprised of four conjoined platforms 26, 27, 28, 29 of comparable size, which are connected by vertical connectors 23, 24, 25. The lowest-most of the four platforms 26 may be longer than the other three platforms 27, 28, 29. Platforms 26, 27, 28, 29 are of sufficient size and depth to allow the supported positioning of the user's foot. The primary securing support 31 is shown with a primary extension member 34 on one end with a surface of sufficient size to support one of the four conjoined platforms 26, 27, 28, 29. A small 90-degree bend creates a protrusion 35 at the distal end of the primary extension member 34 which is intended to be inserted between opposing surfaces of an article of furniture. Both the primary and secondary securing supports 31, 37 include a vertical central component 36, 39, which are determinative of the height at which the step assembly 30 will sit relative to the article of furniture. A secondary securing support 37 comprises a secondary extension member 38 with a planar construction absent a protrusion. The primary securing support 31 and the secondary securing support 37 are affixed to the platforms 26, 27, 28, 29 of the step assembly 30 by a single threaded bolt 20 and held in place by a plastic nut 21. Metal screws, plastic screws, and wing nuts can be utilized, as well as other methods of affixation including, but not limited to, bolts, pegs, latches, screws, hooks, nails, nuts, locks, and male/female fasteners. This design allows for the nut 21 to be loosened and the securing supports 31, 37 to be rotated up to 180 degrees on the inferior surface of the platforms 26, 27, 28, 29 to permit use on either side of the article of furniture.

Figure 10A:
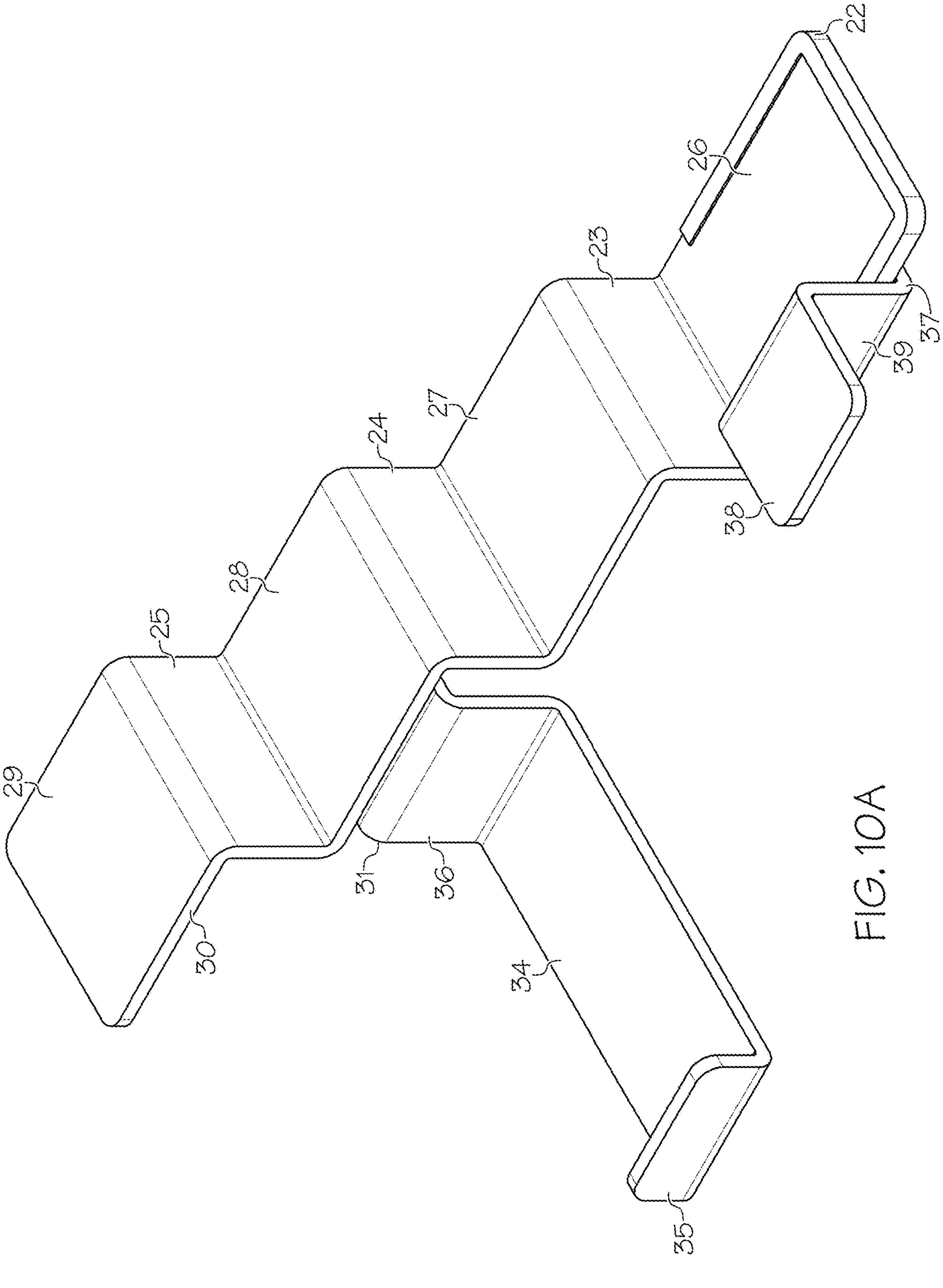
FIGS. 10A-10D are multiple perspectives of an alternate embodiment of the device comprising two securing supports and wherein the step assembly comprises four platforms.
Figure 10B:
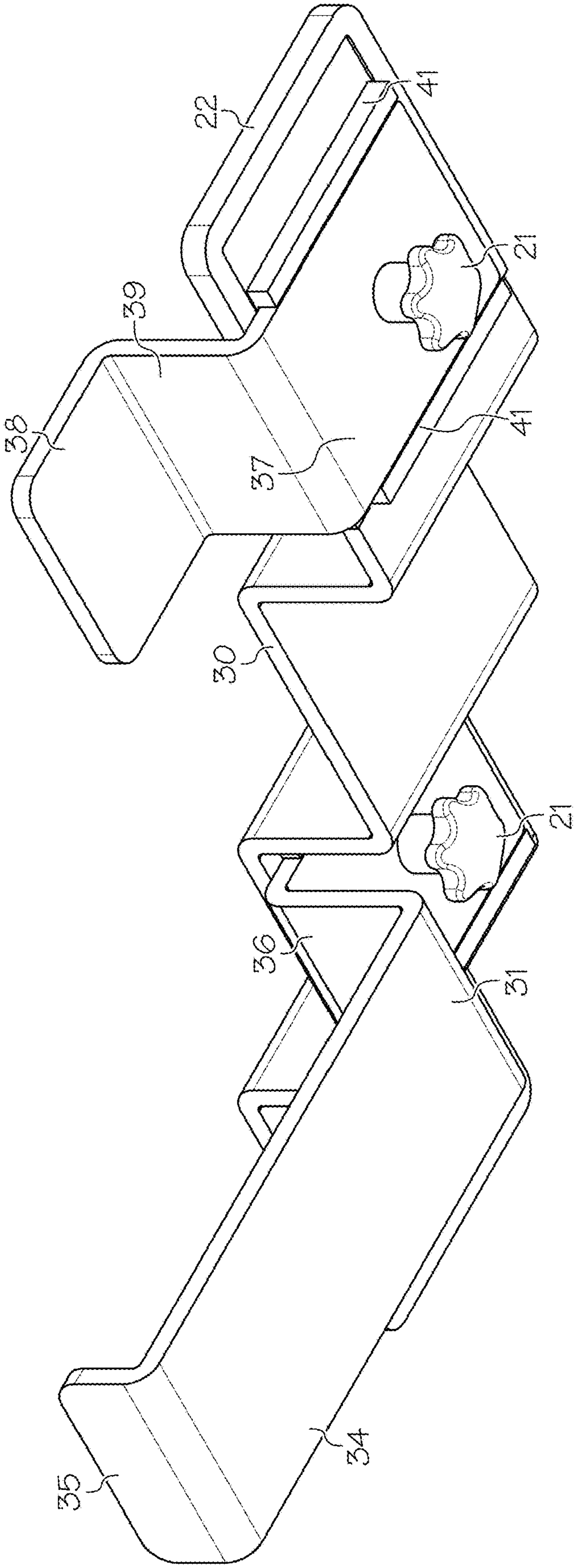
Figure 10C:
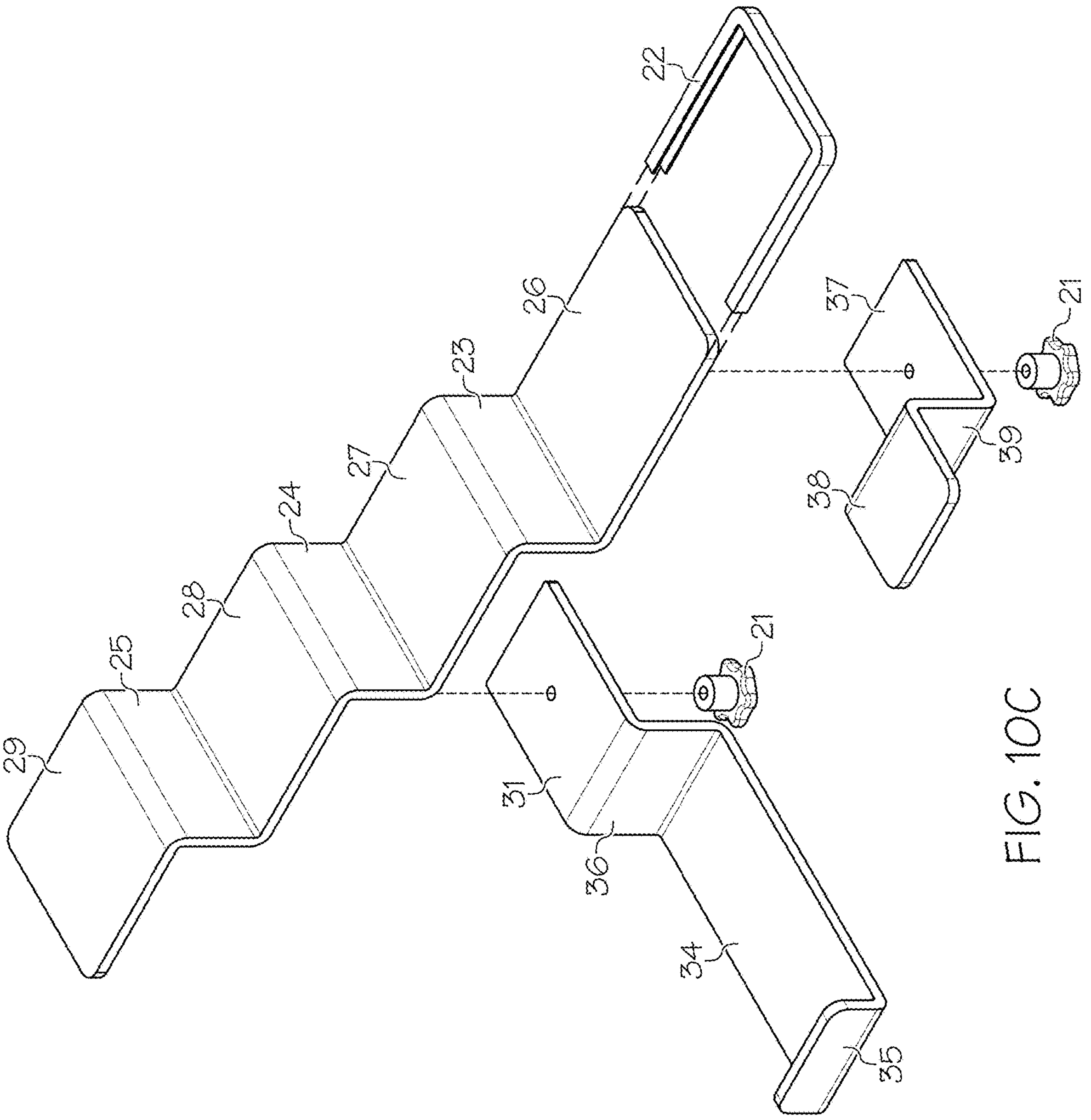
Figure 10D:
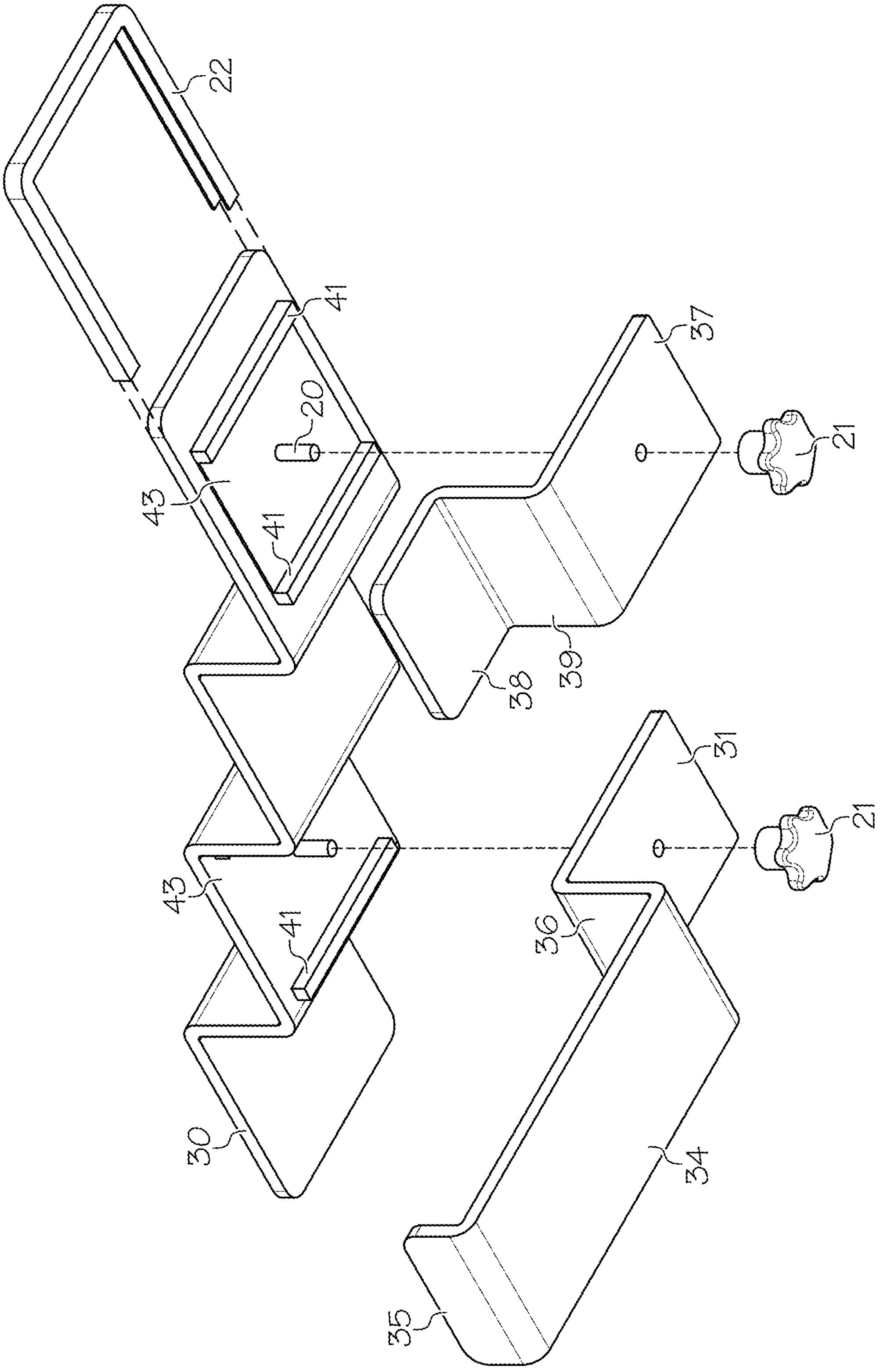

FIGS. 10B and 10D depict the bottom view of the step assembly 30. All platforms 26, 27, 28, 29 further comprise receptacles 43 to keep the step assembly 30 from rotating on the primary or secondary securing supports 31, 37. In this embodiment depicted in FIGS. 10B and 10D, the guardrails 41 are preferred to be approximately ¼ inches thick, however, varying thicknesses can be utilized. The guardrails 41 are spaced to receive the width of the primary securing support 31 and secondary securing support 37. A divot, indent, cavity, inward projection 42, or other receptacle 43 in the underside of platforms 26, 27, 28, 29 has been considered and will work similarly to guardrail 41.

Figure 11A:
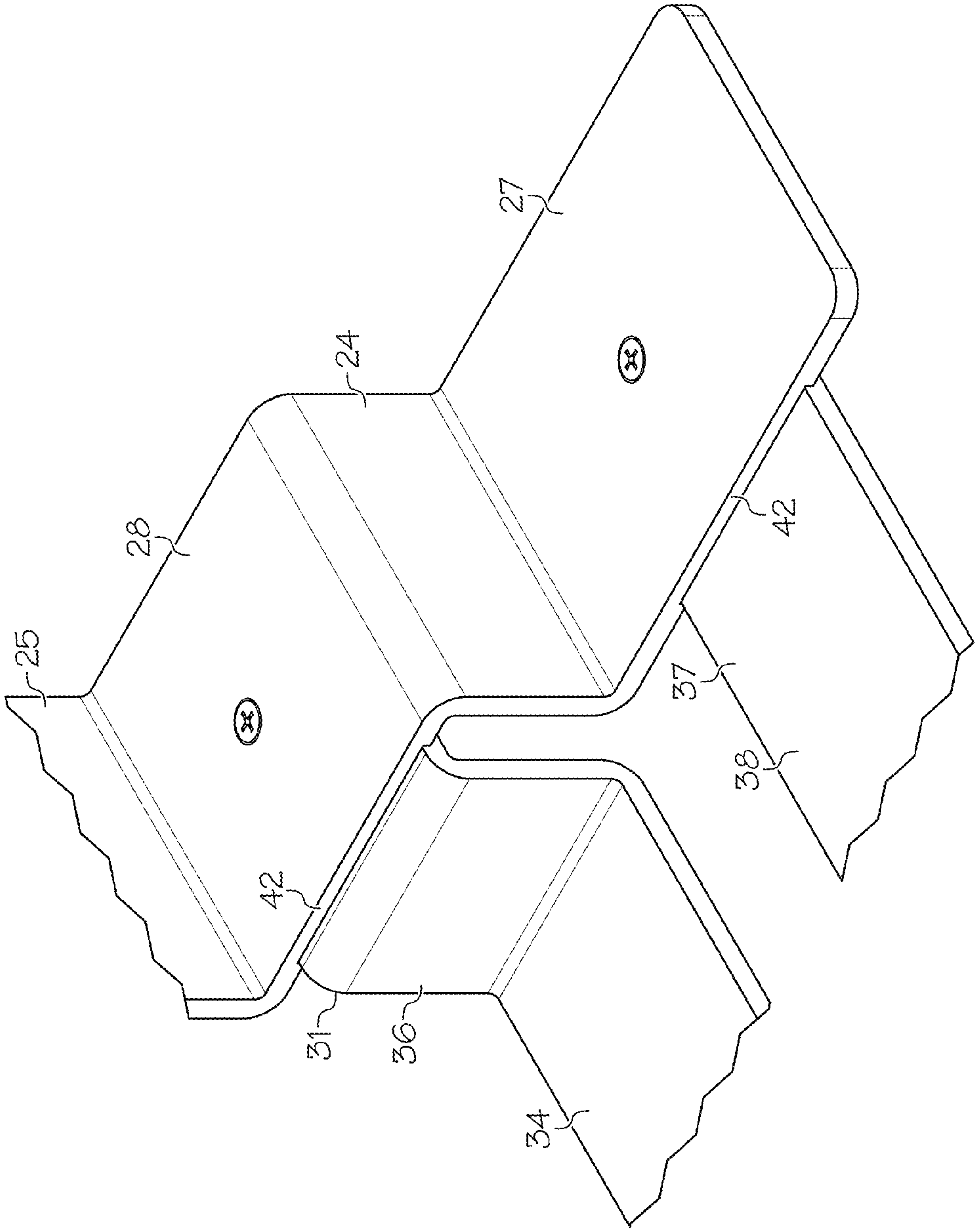
FIGS. 11A-11B depict an alternative embodiment of the device comprising an inward projection on the underside of a platform to receive the top surface of a securing support.
Figure 11B:
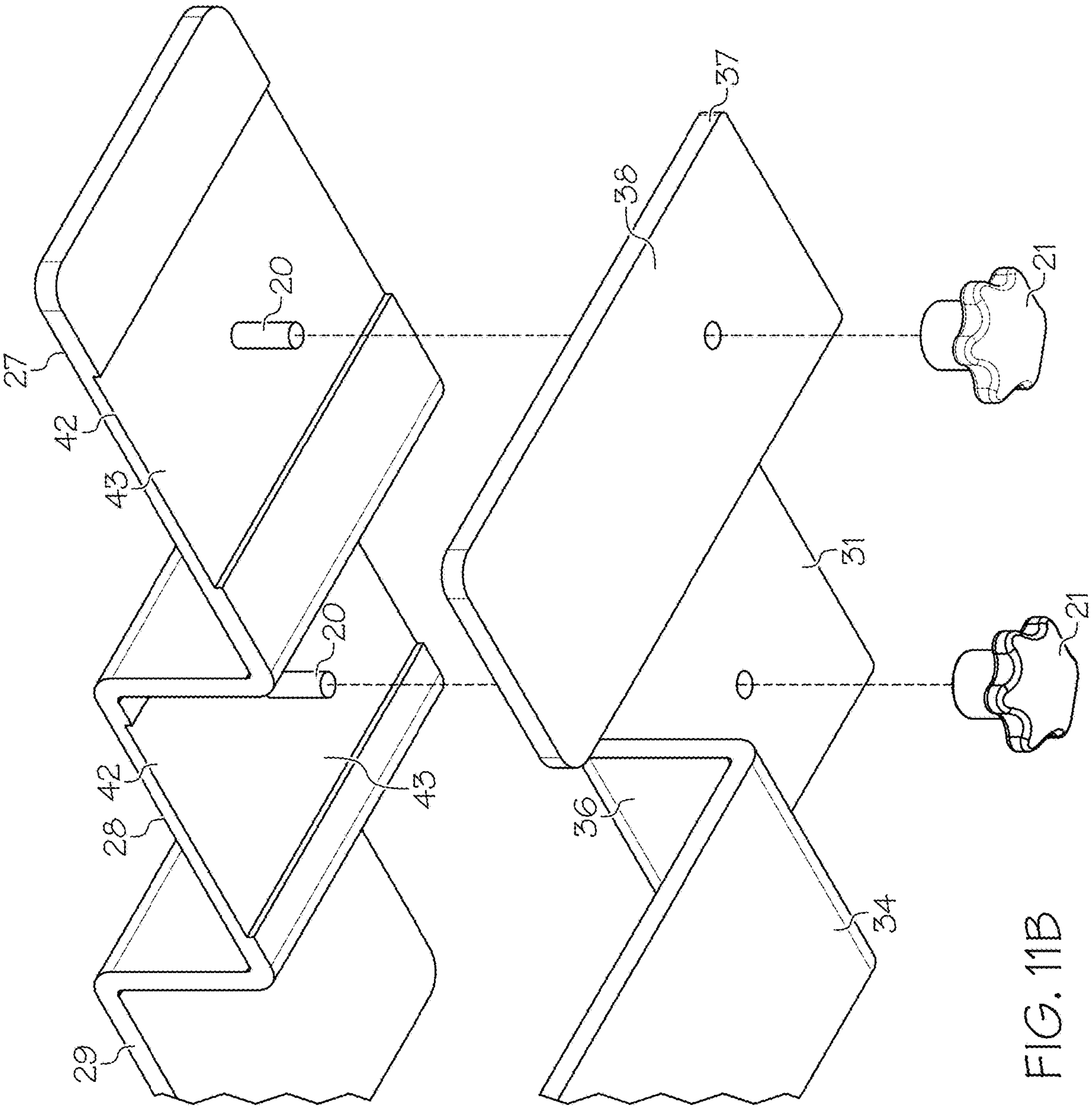

FIGS. 11A-11B depict a top and bottom view of the lower platform 27 and middle platform 28. The platforms 27, 28, 29 further comprise receptacles 43 to keep step assembly 30 from rotating on primary securing support 31. In this embodiment depicted in FIGS. 11A-B, an inwards projection 42 creates a receptacle 43 on the underside of the platforms 27, 28, 29 and are preferred to be about ¼ inch thick. The receptacle 43 is of a size capable of receiving the width of the primary securing support 31 and secondary securing support 37. When a securing support 31, 37 is fitted or fixed within the receptacle 43, the edges of the receptacle 43 prevent rotation of the securing supports 31, 37 around the central axis created by the threaded peg 20. A receptacle 43 on the underside of the platforms 27, 28, 29 may correspond in shape, depth, and size to any outwards projections on securing support 31, 37 and function in the same manner as the guardrail 41. In this embodiment, the receptacles 43 are equally sized and spaced on all platforms 27, 28, 29. Both the primary securing support 31 and secondary securing support 37 are of uniform width, such that the securing supports 31, 37 may be situated within any of the uniform receptacles 43. Accordingly, the user may attach either of the two securing supports 31, 37 to any platform 27, 28, 29. In other embodiments, the size, shape, spacing, or width of the receptacles 43 are not uniform across all platforms 27, 28, 29. such that the primary securing support 31 must be coupled to a specific platform 27, 28, 29.

Figure 12A:
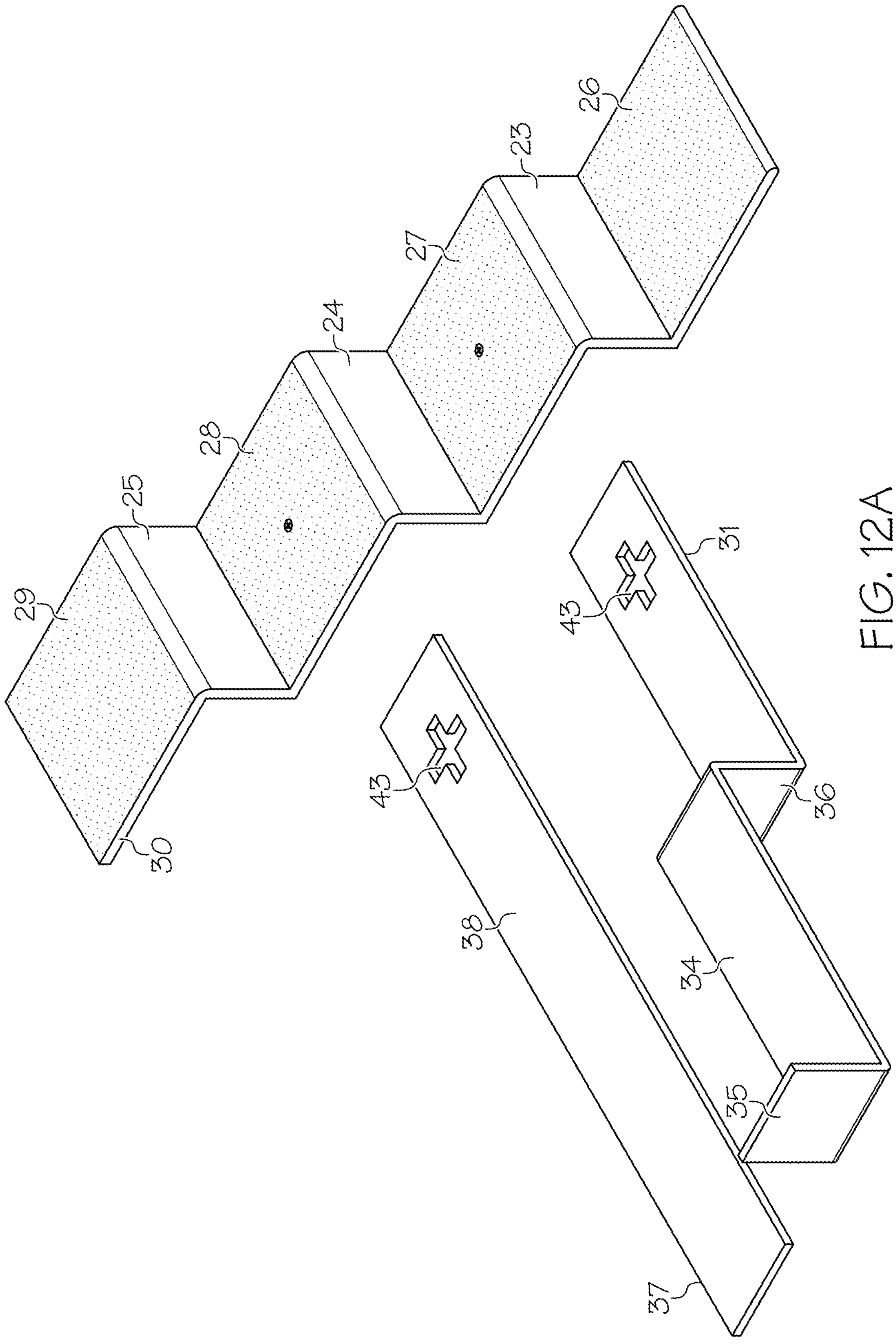
FIGS. 12A-12B depict an alternative embodiment of the device comprising a receptacle on the securing support to accommodate a corresponding outward projection on the bottom surface of a platform.
Figure 12B:
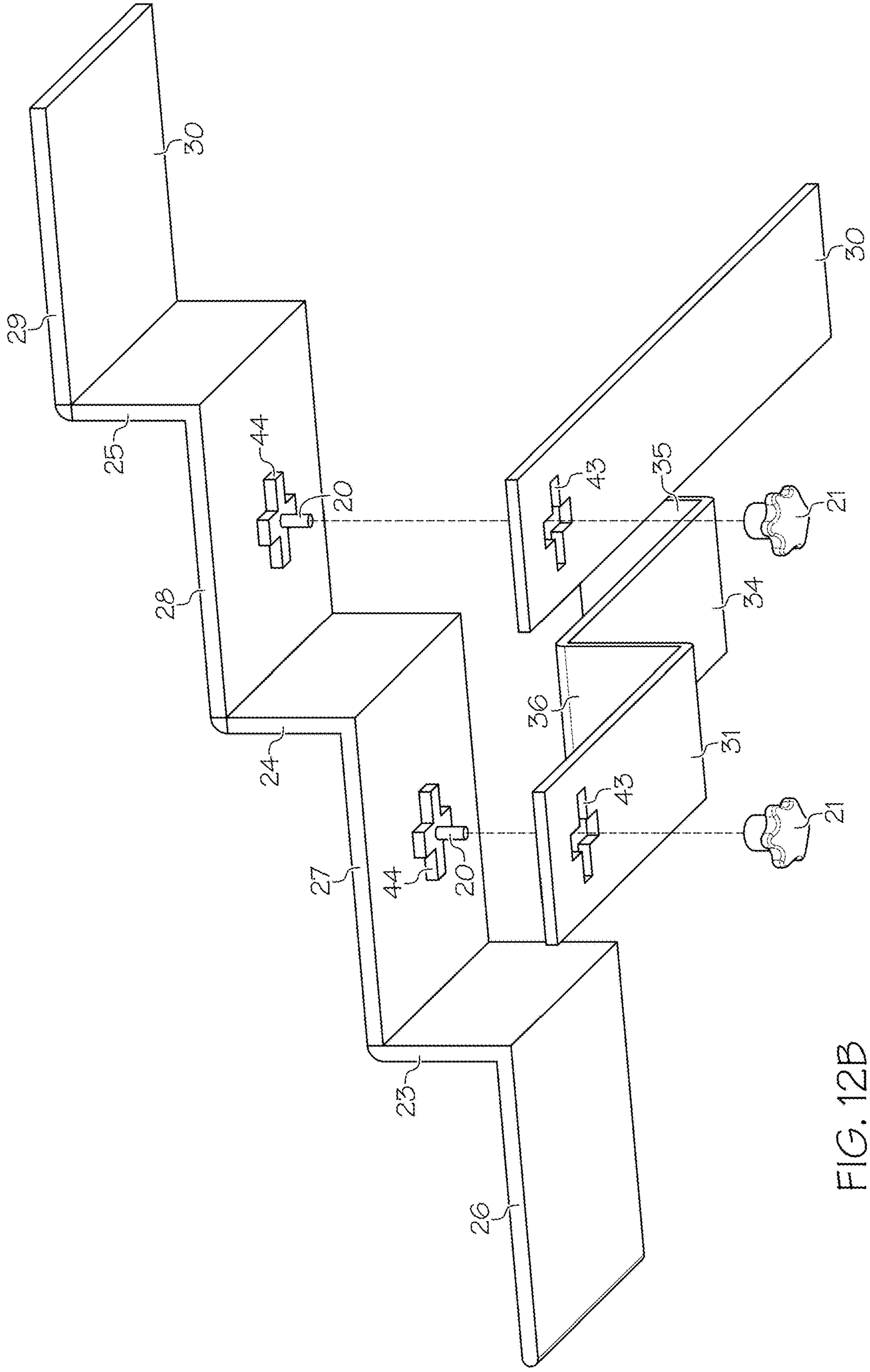

FIGS. 12A-12B are representative of the device in an alternate embodiment. As shown, the device comprises multiple platforms 26, 27, 28, 29 with a cross-shaped protrusion 44 on the bottom of the platforms 27, 28 to accommodate a corresponding cross-shaped receptical 43 on the primary securing support 31 and secondary securing support 37. A threaded peg 20 is molded in place or fused to the platforms 27, 28 such that it is not removable. The cross-shaped receptacle 43 attaches to a peg 20 projecting from the bottom of the higher-middle platform 28 and lower-middle platforms 27. In alternate embodiments, the securing supports 31, 37 may comprise outward projections 44, and the underside of the platforms 26, 27, 28, 29 may comprise the corresponding receptacle 43 or inward projection 42 to receive the outward projections 44 on the securing supports 31, 37. In this embodiment, all edges of platforms 26, 27, 28, 29 are beveled. The platforms 26, 27, 28, 29 further comprise a textured platform surface such as, but not limited to, a cross hatch pattern or pebble patterns to aid with friction and prevent a user's feet from sliding off the platforms 26, 27, 28, 29. Further, the surface of the platforms 26, 27, 28, 29 may be substantially planar or it may comprise an inward projection 42 for resting the user's heel.

Figure 13:
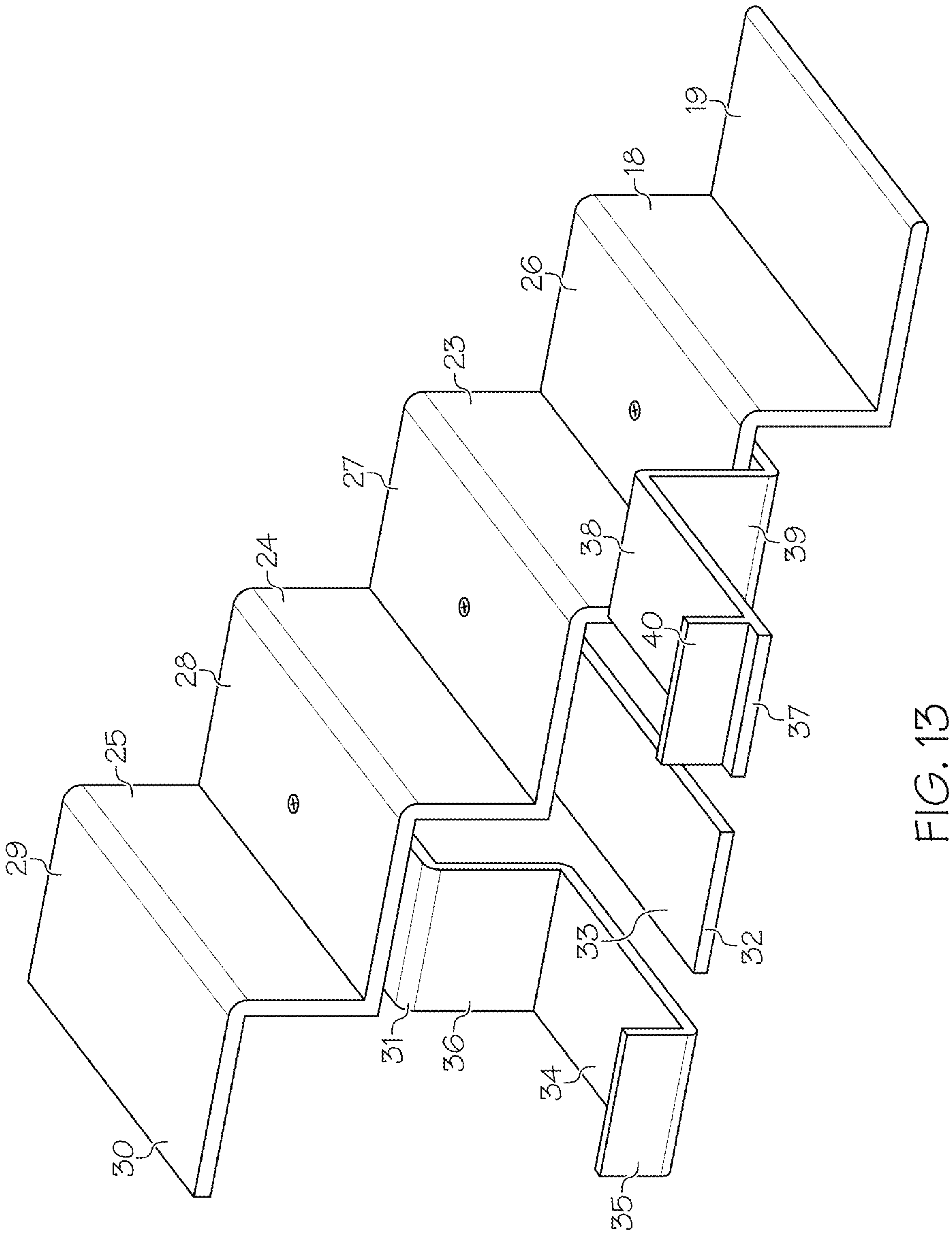
FIG. 13 is perspective a view of an alternative embodiment of the device comprising three securing supports and a step assembly further comprising five platforms.

FIG. 13 depicts an additional embodiment. As shown, the device comprises five platforms 19, 26, 27, 28, 29 with threaded pegs 20 or holes within which a screw may be placed on the tread of each platform 19, 26, 27, 28, 29 for user to decide which platform 19, 26, 27, 28, 29 to attach the primary securing support 31. The plurality of platforms 19, 26, 27, 28, 29 of this embodiment may be thicker and made of material which is able to sustain greater weight loads. Platforms 19, 26, 27, 28, 29 further comprise a textured surface made of a cross hatch or pebbled pattern. The primary securing support 31 may be attached to the platform 19, 26, 27, 28, 29 with a metal nut, plastic nut, or wing nut 21. The primary securing support 31 comprises a vertical central component 36 which extends vertically above the primary extension member 34 and enables the primary extension member 34 to sit at a height below the platform 19, 26, 27, 28, 29 to which it is attached. The primary extension member 34 comprises a vertical protrusion 35. The secondary securing support 37 comprises a vertical central component 39 which extends vertically below the secondary extension member 38 and enables the secondary extension member 38 to sit at a height above the platform 19, 26, 27, 28, 29 to which it is attached. These vertical central components 36, 39 allow the primary and secondary securing supports 31, 37 to attach to platforms 19, 26, 27, 28, 29 which sit at various levels, while also ensuring that the primary and secondary extension members 34, 38 align on the same horizontal plane.

The secondary extension member 38 of the secondary securing support 37 comprises a protrusion 40. This protrusion 40 stretches across the width of the secondary extension member 38. Unlike the protrusion 35 of the primary extension member 34, the protrusion 40 of the secondary extension member 38 does not sit along the perimeter of the terminal end of the secondary extension member 38. Rather, the protrusion 40 of the secondary extension member 38 sits along the internal surface area of the secondary extension member 38. Additionally, this embodiment further comprises a tertiary securing support 32 with a tertiary extension member 33. The tertiary securing support 32 connects to the middle platform 27. The tertiary extension member 33 of this embodiment is substantially planar and lacks a protrusion. In alternate embodiments, additional securing supports may further support the step assembly 30. These additional securing supports may comprise protrusions, or be substantially planar, without protrusions. Additionally, each platform 19, 26, 27, 28, 29 may have a hole for the insertion of a screw 20 or molded peg to allow the user to adjust the height of the platforms 19, 26, 27, 28, 29 relative to the article of furniture, by selecting which platforms 19, 26, 27, 28, 29 to attach the securing supports 31, 32, 37 to.

Figure 14B:
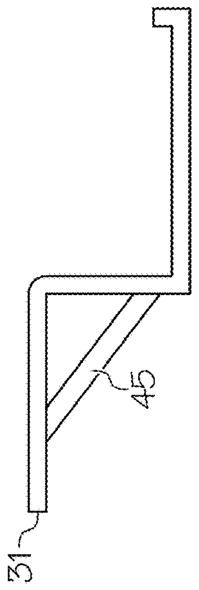
FIGS. 14A-14C are perspective views of an alternative embodiment of the device comprising a diagonal brace on a securing support or platform that can be attached to the step assembly as described herein.
Figure 14C:
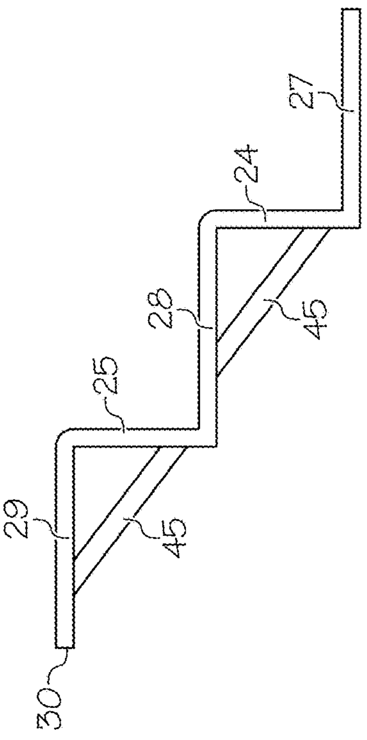
Figure 14A:
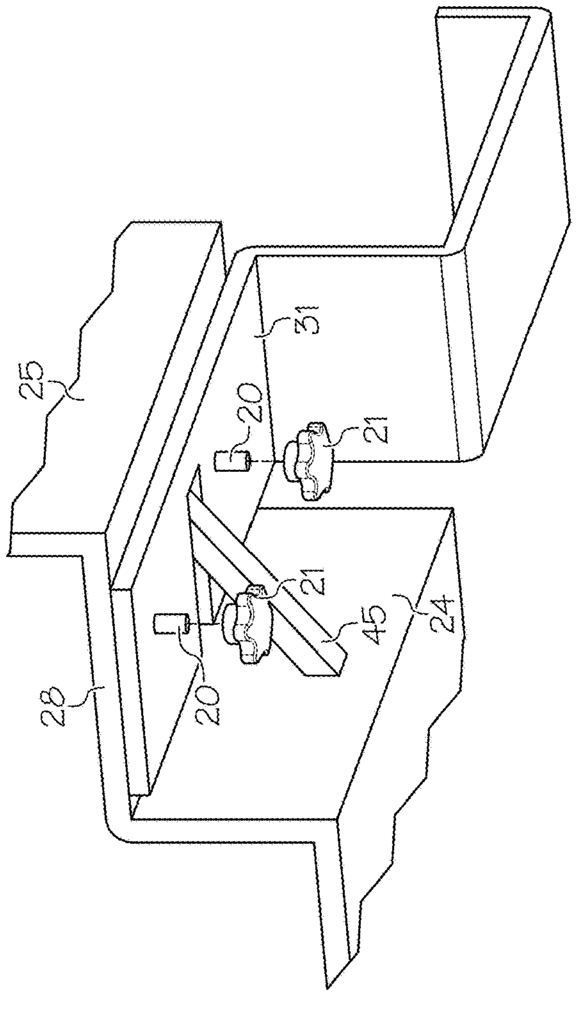

FIGS. 14A-14C depict a diagonal brace 45 on a securing support 31 and under the platforms 27, 28, 29 that are connected to the bottom edge of vertical connector 24, 25. The vertical connectors 24, 25 of this embodiment are risers. The securing support 31 is attached to the platforms 27, 28, 29 with two screws on either side of the platforms 27, 28, 29. The securing support 31 can be attached with alternative fastening methods, as previously described in the detailed description. The diagonal support 45 may connect to two or more sequential platforms 27, 28, 29, or it may connect to one vertical connector 24, 25 and one platform 27, 28, 29. This offers additional support to the step assembly 30.

Figure 15A:
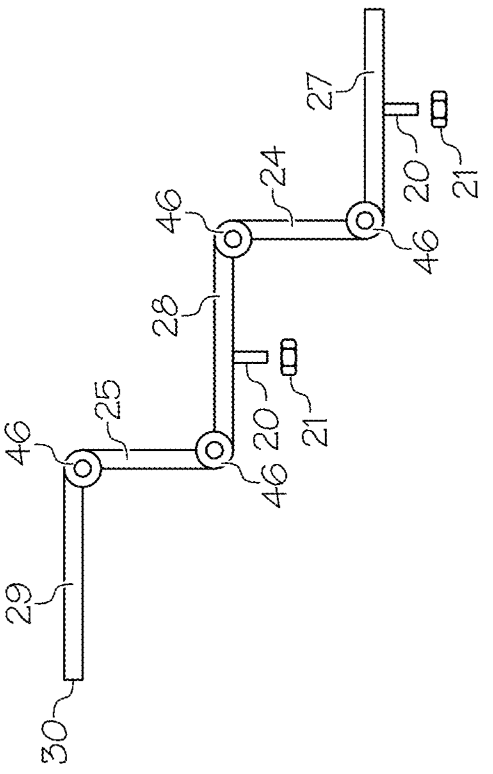
FIGS. 15A-15B are perspective views of an alternative embodiment of the device comprising a collapsible step assembly and collapsible securing support.
Figure 15B:
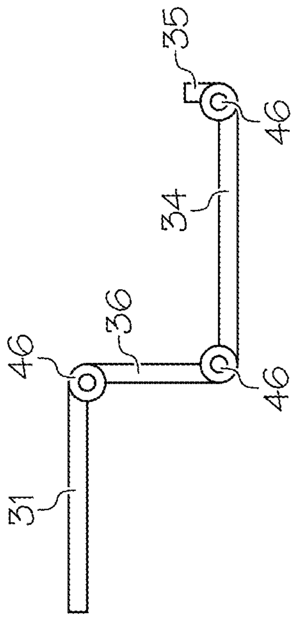
Figure 16A:
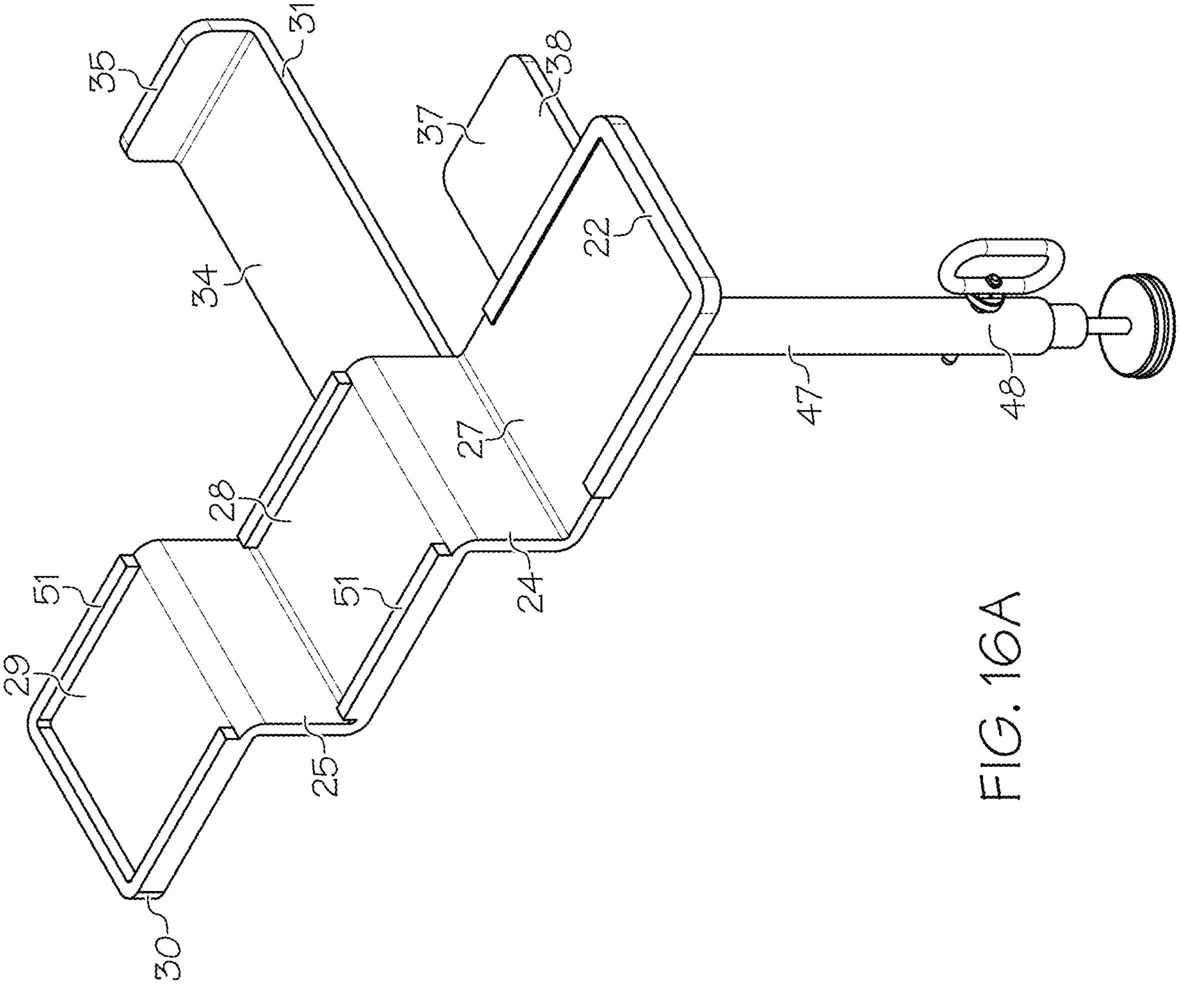
FIGS. 16A-16D are perspective views of an alternative embodiment of the device comprising a support leg that may be attached to various embodiments described herein.
Figure 16B:
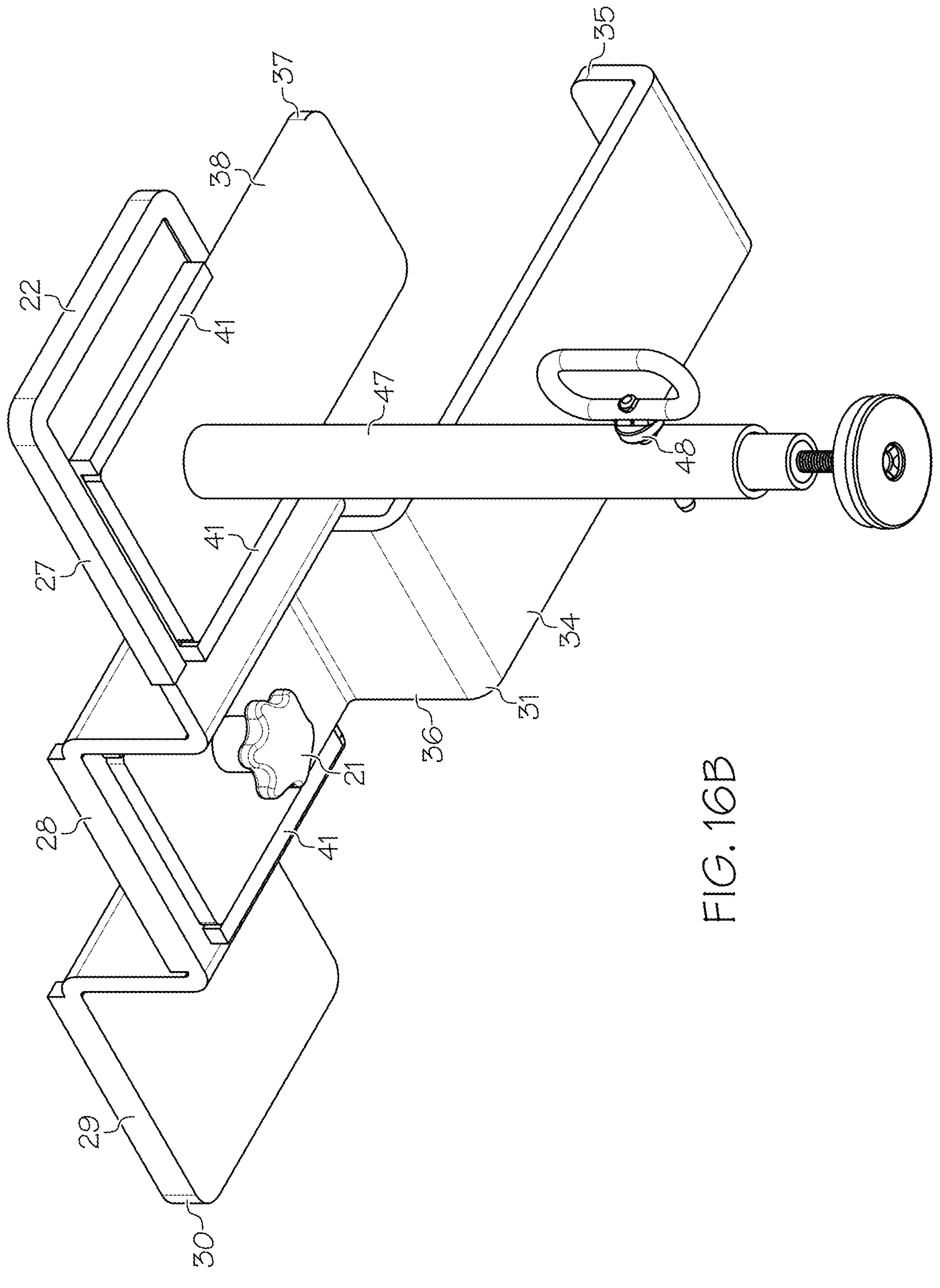
Figure 16C:
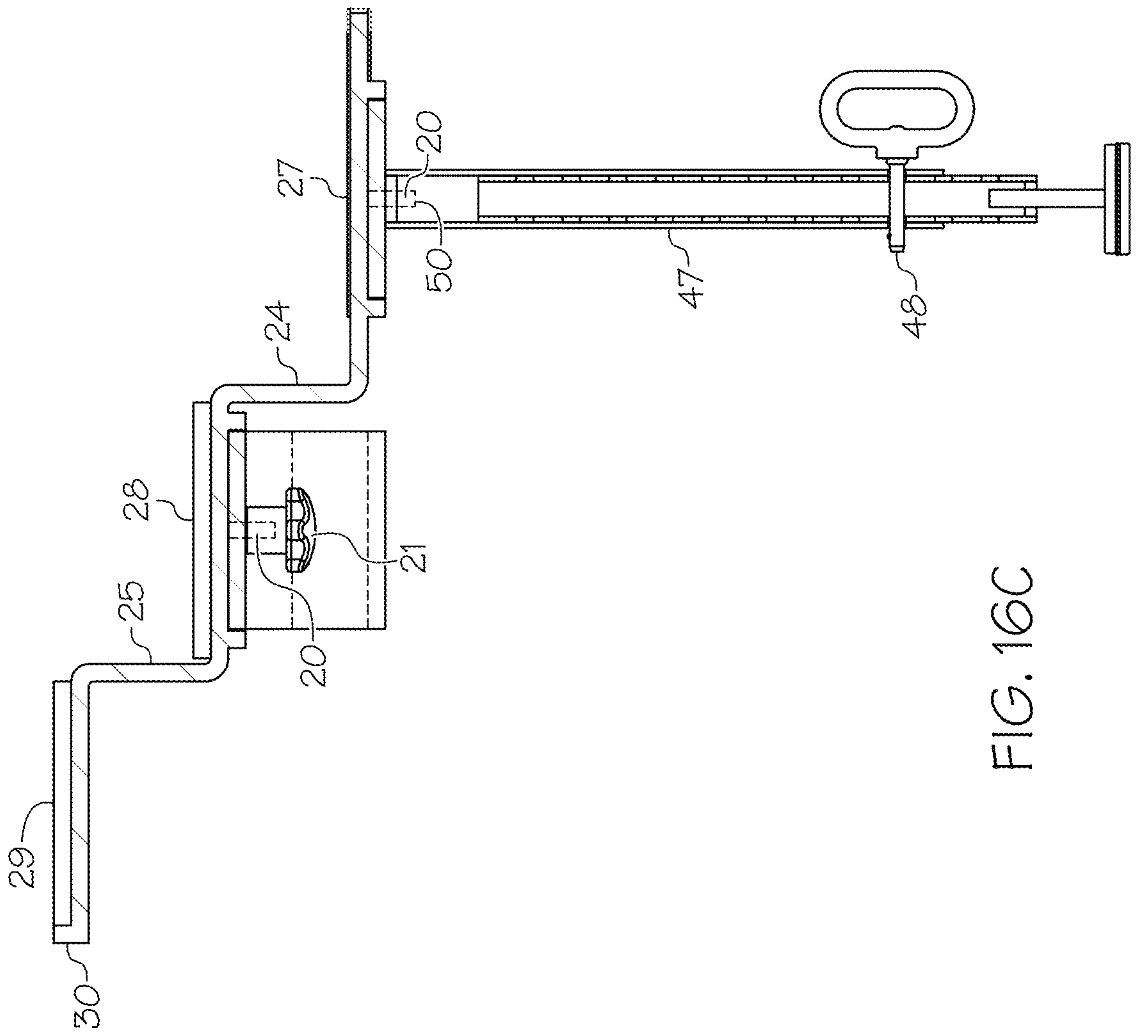
Figure 16D:
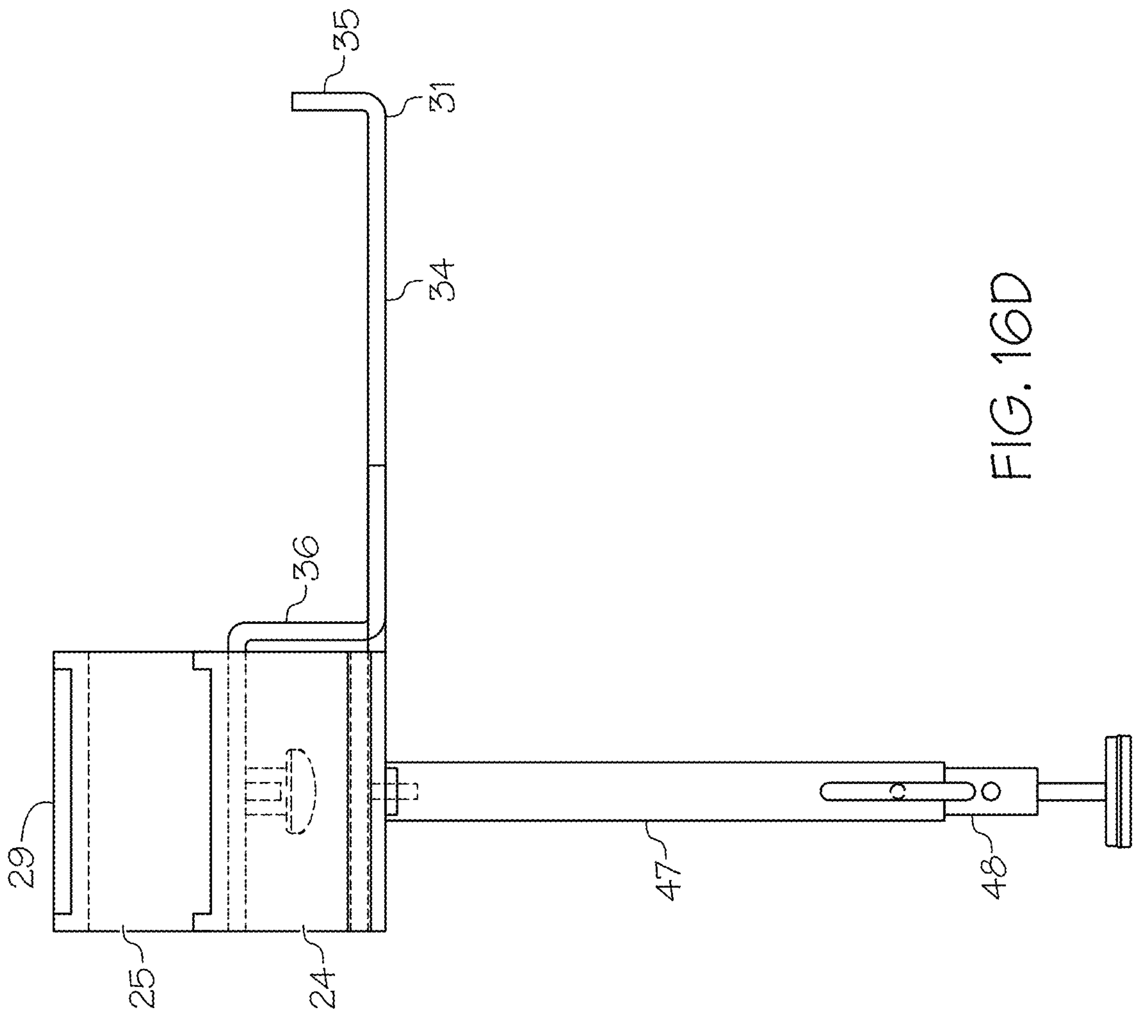

FIGS. 15A-15B depict a further embodiment. As shown, the device comprises equal sized, foldable platforms 27, 28, 29 and one foldable securing support 31. While three platforms 27, 28, 29 are depicted, additional platforms can be utilized. The vertical connectors 24, 25 between the platforms 27, 28, 29 comprise a hinge 46 which allows the platforms 27, 28, 29 and vertical connectors 24, 25 to be pivotally connected so that step assembly 30 can fold or collapse together into a storage position. As shown the primary securing support 31 may also comprise hinges 46 at the top and bottom of vertical connector 36 and at the base of protrusion 35 to allow the primary securing support 31 to collapse together into a storage position. In some embodiments, the hinges 46 may be limited in their degree of freedom, such that the hinges are only able to open to the degree necessary for the construction of the device. Hinges may include, but are not limited to, pivot points, butt hinges, concealed hinges, barrel hinges, strap hinges, piano hinges, double action hinges pivot points, pins and mounts, and the like. The collapsable apparatus can retract and expand using frictional, mechanical, electrical, and/or computerized means or methods. In some embodiments, the vertical connectors 24, 25 are risers. In alternate embodiments, the vertical connectors 24, 25 are articulating links, support rods, kick plates, stringers, beams, or other structural supports. The securing support 31 may alternatively be retractable or telescoping.

FIGS. 16A-16D depicts a support leg 47 that may be attached to the underside of a secondary securing support 37. The step assembly 30 of this embodiment comprises three horizontal platforms 27, 28, 29 attached to two vertical connectors 24, 25. The vertical connectors 24, 25 of this embodiment are risers. The primary securing support 31 is attached to the middle platform 28 and includes a primary extension member 34 having a protrusion 35. A secondary securing support 37 is attached to the lower-most platform 27. The secondary securing support 37 comprises a secondary extension member 38 that is substantially planar and lacks a protrusion. The step assembly 30 may comprise a lip 51 or ridge running along the outer edge of one or more of the plurality of platforms 27, 28, 29 to catch a user's feet should they slide and lose grip. In this embodiment, the secondary securing support 37 is connected to the lowest platform 27 of the step assembly 30 and the support leg 47, thereby indirectly attaching the telescoping support leg 47 to the step assembly 30. In this embodiment, a threaded peg protruding from the underside of the lowest platform 27 permits attachment of the securing support 37 thereto. In this embodiment, the support leg 47 has a threaded hole 50 bored into the top of it of larger diameter than that of threaded peg 20 such that the support leg 47 can screw in and attach to secondary securing support 37. Other male and female fasteners may be utilized to connect the support leg 47 to the step assembly 30, such as a U-shaped receptacle on the bottom of primary securing support 31 or secondary securing support 37 that can enable the support leg 47 to slide in and lock the support leg 47 in place. The support leg 47 may alternately screw into the corresponding threaded screw 20 on platform 28 therby attaching it to securing support 31. The support leg 47 may comprise a cotter pin 48 that can be inserted into any number of holes on leg 47 to adjust the height of the leg 47 and allow the support leg 47 to telescope. Support leg 47 might alternately telescope through various types of mechanisms, such as, but not limited to, releasable locking mechanism, sliding mechanism, friction jamming mechanism, button release sliding mechanism, pulleys, bolts, and the like.

The above-referenced descriptions are illustrative of the present invention. Numerous modifications and alternative arrangements can be devised without departing from the spirit and scope of the invention. The drawings can be treated as independent embodiments of the present invention. Various elements of the disclosed embodiments may be reworked and integrated with each other or used in combination. Those skilled in the art will readily recognize various adaptations which can be made to the invention which will result in an improved mobility device, yet all will fall within the scope and spirit of the present invention as defined in the following claims.

What is claimed is:

1. An apparatus, comprising:

a step assembly comprising:

at least two horizontal platforms connected by at least one vertical connector;

wherein each of said at least two horizontal platforms further comprises a first edge and a second edge;

wherein the first edge and second edge are perpendicular to each other; and wherein the second edge of each horizontal platform is positioned along the outer perimeter of at least one article of furniture;

at least one securing support partially disposed within said at least one article of furniture, wherein said at least one securing support further comprises:

at least one extension member that is fully positioned between opposed surfaces of said at least one article of furniture;

wherein the length of said at least one extension member is less than the length of said at least one article of furniture; and wherein one or more sides of said at least one extension member has at least one protrusion that secures said at least one extension member to said at least one article of furniture; and wherein said at least one securing support is perpendicularly connected to said step assembly.

2. An apparatus according to claim 1, wherein the height of said step assembly is less than the distance between the top surface of the at least one article of furniture and ground level.

3. An apparatus according to claim 1, wherein at least one of said step assembly and said at least one securing support is a unitary structure.

4. An apparatus according to claim 1, wherein said step assembly and/or said at least one securing support are modularly connected to each other.

5. An apparatus according to claim 1, further comprising at least one attachment, wherein said at least one attachment allows said at least one securing support to rotate about an axis relative to said step assembly.

6. An apparatus according to claim 1, wherein said at least one protrusion comprises of a vertical or an angled component.

7. An apparatus according to claim 1, further comprising:

at least one floor contacting member;

wherein said at least one floor contacting member can retract and extend relative to said step assembly; and wherein said at least one floor contacting member is attached to said step assembly or said at least one securing support by mating releasable fasteners.

8. An apparatus according to claim 1, wherein at least one of said step assembly and said at least one securing support further comprises the capability of collapsing for storage or portability.

9. An apparatus according to claim 1, wherein the elevation of the step assembly can be increased or decreased by adjusting the connection or attachment between the step assembly and at least one securing support.

10. An apparatus according to claim 1, wherein the surface area of at least one of the plurality of platforms has varying elevation.

11. An apparatus according to claim 1, wherein the surface area of the at least one extension member has varying elevations.

12. An apparatus according to claim 1, wherein at least one of said at least two horizontal platforms comprises a receptacle on the bottom surface within which said at least one securing support can be connected to said step assembly.

13. An apparatus according to claim 1, further comprising a receptacle on said at least one securing support within which one or more of said at least two platforms can be connected to said at least one securing support.

14. An apparatus according to claim 1, wherein said step assembly further comprises at least one angled support brace connected to said at least one vertical connector.

15. An apparatus, comprising:

a step assembly comprising:

at least two horizontal platforms connected by at least one vertical connector;

wherein each of said at least two horizontal platforms further comprises a first edge and a second edge;

wherein the first edge and second edge are perpendicular to each other; and wherein the second edge of each horizontal platform is positioned along the outer perimeter of at least one article of furniture;

at least two securing supports partially disposed within said at least one article of furniture, wherein:

at least one primary securing support comprises a primary extension member;

wherein one or more sides of said primary extension member has at least one protrusion that secures said primary extension member to said at least one article of furniture; and at least one secondary securing support comprises a secondary extension member;

wherein said primary extension member and said secondary extension member are fully positioned between opposed surfaces of said at least one article of furniture;

wherein the length of said at least one primary securing support is less than the length of said at least one article of furniture; and wherein said at least one primary securing support is perpendicularly connected to said step assembly.

16. An apparatus according to claim 15, wherein said secondary extension member has one or more sides with secondary protrusion that secures said at least one extension member to said at least one article of furniture.

17. An apparatus according to claim 15, wherein said secondary extension member is of a flat, planar shape absent the presence of a protrusion.

18. An apparatus according to claim 15, wherein said primary extension member and said secondary extension member are aligned on the same plane; and wherein at least one of said at least one primary securing support and at least one of said at least one secondary securing support are attached to said platforms at different elevations.

19. A method, comprising:

positioning a step assembly wherein the step assembly comprises of at least two horizontal platforms connected by at least one vertical connector, wherein each of said at least two horizontal platforms further comprises a first edge and a second edge, wherein the first edge and second edge are perpendicular to each other, wherein the second edge of each horizontal platform is positioned along the outer perimeter of at least one article of furniture, wherein the step assembly is fully elevated above ground level; and wherein a securing support attached to said step assembly is situated between opposed surfaces of said at least one article of furniture;

preparing to ascend by sitting upright on a top surface of said at least one article of furniture adjacent to the outer perimeter of said at least one article of furniture, wherein a user's posterior is fully supported by said top surface of the at least one article of furniture, and wherein said user's feet are at said ground level adjacent to said step assembly;

adjusting from sitting upright to side-lying on said at least one article of furniture, by raising said user's feet to a subsequent horizontal platform of said step assembly and lowering their posterior toward a position parallel to said at least one article of furniture, and continuing raising to sequentially higher platforms until the user's feet reach the top surface of said at least one article of furniture; and log-rolling said user to supine position on the at least one article of furniture upon the user's feet reaching the top surface of said at least one article of furniture.

20. A method according to claim 19, further comprising:

sitting upright on a top surface of said at least one article of furniture adjacent to the outer perimeter of said at least one article of furniture, wherein a user's posterior is fully supported by said top surface of the at least one article of furniture, wherein said user may descend by adjusting from side-lying to sitting upright and lowering said user's feet to the upper-most horizontal platform of said step assembly and raising their posterior toward a position parallel to said at least one article of furniture; and lowering said user's feet to a subsequent horizontal platform and continuing until said user's feet reach the ground level.

* * * * *